(12) United States Patent
Noh et al.

(10) Patent No.: US 10,470,212 B2
(45) Date of Patent: Nov. 5, 2019

(54) METHOD, APPARATUS, AND SYSTEM FOR CHANNEL ACCESS IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 15/960,541

(22) Filed: Apr. 23, 2018

(65) Prior Publication Data

US 2018/0242360 A1 Aug. 23, 2018

Related U.S. Application Data

(63) Continuation of application No. PCT/KR2016/012400, filed on Oct. 31, 2016.

(30) Foreign Application Priority Data

Oct. 29, 2015 (KR) .................. 10-2015-0151330
Feb. 5, 2016 (KR) .................. 10-2016-0015312

(51) Int. Cl.
*H04W 74/08* (2009.01)
*H04L 1/16* (2006.01)
(Continued)

(52) U.S. Cl.
CPC ....... *H04W 74/0808* (2013.01); *H04L 1/1657* (2013.01); *H04L 1/1812* (2013.01);
(Continued)

(58) Field of Classification Search
None
See application file for complete search history.

(56) References Cited

U.S. PATENT DOCUMENTS

2012/0300712 A1 11/2012 Hakola et al.
2016/0278088 A1* 9/2016 Cheng .................. H04L 47/27
(Continued)

FOREIGN PATENT DOCUMENTS

KR 10-0679320 2/2007
KR 10-2010-0063332 6/2010
(Continued)

OTHER PUBLICATIONS

International Search Report for PCT/KR2016/012400 dated Mar. 8, 2017 and its English translation from WIPO (published as WO 2017/074160).
(Continued)

*Primary Examiner* — Kodzovi Acolatse
(74) *Attorney, Agent, or Firm* — Ladas & Parry LLP

(57) ABSTRACT

The present invention relates to a method, an apparatus and a system for adjusting a contention window size for performing channel access. In particular, the present invention provides a method comprising: receiving a plurality of hybrid automatic repeat request acknowledgment (HARQ-ACK) responses for downlink transmission(s) in a reference subframe of the specific cell; setting a contention window size for a transmission in the specific cell; selecting a random number N within the contention window size; and performing, when a channel of the specific cell is idle for at least N slot periods, a downlink transmission on the channel, wherein the setting a contention window size comprises: increasing the contention window size to a next higher allowed value and maintaining the increased value when a ratio of negative acknowledgement (NACK) among the plurality of HARQ-ACK responses is equal to or more than (Continued)

a reference value, and setting the contention window size to a minimum value when the ratio of the NACK among the plurality of HARQ-ACK responses is less than the reference value, and an apparatus and a system therefor.

16 Claims, 18 Drawing Sheets

(51) Int. Cl.
    *H04L 1/18*     (2006.01)
    *H04W 84/12*     (2009.01)
    *H04W 16/14*     (2009.01)
    *H04W 72/04*     (2009.01)

(52) U.S. Cl.
    CPC ........... *H04L 1/1861* (2013.01); *H04W 16/14* (2013.01); *H04W 72/0453* (2013.01); *H04W 84/12* (2013.01)

(56) References Cited

U.S. PATENT DOCUMENTS

| | | | |
|---|---|---|---|
| 2017/0041957 A1* | 2/2017 | Pazhyannur | H04W 74/0808 |
| 2017/0048860 A1* | 2/2017 | Damnjanovic | H04W 74/0808 |
| 2017/0188387 A1* | 6/2017 | Mukherjee | H04W 74/0808 |
| 2018/0199376 A1* | 7/2018 | Kim | H04L 1/18 |
| 2019/0014596 A1* | 1/2019 | Yang | H04W 72/04 |

FOREIGN PATENT DOCUMENTS

| | | |
|---|---|---|
| KR | 10-2012-0071144 | 7/2012 |
| WO | 2017/074160 | 5/2017 |

OTHER PUBLICATIONS

Written Opinion of the International Searching Authority for PCT/KR2016/012400 dated Mar. 8, 2017 and its English machine translation by Google Translate (published as WO 2017/074160).
Mukherjee, Amitav et al., "System Architecture and Coexistence Evaluation of Licensed-Assisted Access LTE with IEEE 802.11", In: Communication Workshop (ICCW), 2015 IEEE International Conference on Jun. 8-12, 2015, see pp. 2351-2353.

\* cited by examiner (a) LAA DL transmission burst starting with a regular subframe (b) LAA DL transmission burst starting with a partial subframe

METHOD, APPARATUS, AND SYSTEM FOR CHANNEL ACCESS IN UNLICENSED BAND

CROSS-REFERENCE TO RELATED APPLICATIONS

This application is a continuation of International Patent Application No. PCT/KR2016/012400 filed on Oct. 31, 2016, which claims the priority to Korean Patent Application No. 10-2015-0151330 filed in Korean Intellectual Property Office on Oct. 29, 2015, and Korean Patent Application No. 10-2016-0015312 filed in the Korean Intellectual Property Office on Feb. 5, 2016, the entire contents of which are incorporated herein by reference.

TECHNICAL FIELD

The present invention relates to a wireless communication system. Particularly, the present invention relates to a method, an apparatus, and a system for performing channel access in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to an embodiment of the present invention, a wireless communication apparatus and a wireless communication method as below are provided.

First, an exemplary embodiment of the present invention provides a method for performing downlink transmission in a specific cell by a base station in a cellular wireless communication system, the method including: receiving a plurality of hybrid automatic repeat request acknowledgement (HARQ-ACK) responses for downlink channel(s) of the specific cell; generating a random number N ($N \geq 0$) in a contention window size; and performing the downlink transmission in the specific cell after standing by for N slots while the specific cell is idle, wherein when a ratio of negative acknowledgement (NACK) among the plurality of HARQ-ACK responses is equal to or more than a reference value, the contention window size becomes larger than a previous value, and when the ratio of the NACK among the plurality of HARQ-ACK responses is less than the reference value, the contention window size is reset to a minimum value.

In addition, another exemplary embodiment of the present invention provides a base station used in a cellular wireless communication system, the base station including: a wireless communication module; and a processor, wherein the processor is configured to receive a plurality of hybrid automatic repeat request acknowledgement (HARQ-ACK) responses for downlink channel(s) of the specific cell, generate a random number N ($N \geq 0$) in a contention window size, and perform the downlink transmission in the specific cell after standing by for N slots while the specific cell is idle, when a ratio of negative acknowledgement (NACK) among the plurality of HARQ-ACK responses is equal to or more than a reference value, the contention window size becomes larger than a previous value, and when the ratio of the NACK among the plurality of HARQ-ACK responses is less than the reference value, the contention window size is reset to a minimum value.

When the plurality of HARQ-ACK responses includes discontinuous transmission (DTX), the ratio of the NACK may additionally include a ratio of the DTX.

The downlink channel(s) may be included in a plurality of adjacent subframes on the specific cell which are most recently present before the downlink transmission.

All of the downlink channel(s) may be included in first one subframe among the plurality of adjacent subframes on the specific cell.

All of the downlink channel(s) may be included in first two subframes among the plurality of adjacent subframes and 1st subframe of the first two subframes may be a partial subframe.

The specific cell may be an unlicensed cell and the plurality of HARQ-ACK responses may be received from a plurality of user equipments through a licensed cell.

In the case of the reference value, $0 < \text{reference value} < 1$ or $0\% < \text{reference value} < 100\%$.

Yet another exemplary embodiment of the present invention provides a method for performing downlink transmission in a specific cell by a base station in a cellular wireless communication system, the method including: receiving a plurality of hybrid automatic repeat request acknowledgement (HARQ-ACK) responses for downlink channel(s) of the specific cell; verifying whether the specific cell is idle for a random time in a contention window when the specific cell is idle for a predetermined time; and performing the downlink transmission in the specific cell when the specific cell is idle for the random time in the contention window, wherein when a ratio of negative acknowledgement (NACK) among the plurality of HARQ-ACK responses is equal to or more than a reference value, the contention window size becomes larger than a previous value, and when the ratio of the NACK among the plurality of HARQ-ACK responses is less than the reference value, the contention window size is set to a minimum value.

In addition, yet another exemplary embodiment of the present invention provides a base station used in a cellular wireless communication system, the base station including: a wireless communication module; and a processor, wherein the processor is configured to receive a plurality of hybrid automatic repeat request acknowledgement (HARQ-ACK) responses for downlink channel(s) of the specific cell, verify whether the specific cell is idle for a random time in a contention window when the specific cell is idle for a predetermined time; and perform the downlink transmission in the specific cell when the specific cell is idle for the random time in the contention window, wherein when a ratio of negative acknowledgement (NACK) among the plurality of HARQ-ACK responses is equal to or more than a reference value, the contention window size becomes larger than a previous value, and when the ratio of the NACK among the plurality of HARQ-ACK responses is less than the reference value, the contention window size is set to a minimum value.

When the plurality of HARQ-ACK responses includes discontinuous transmission (DTX), the ratio of the NACK may additionally include a ratio of the DTX.

The downlink channel(s) may be included in a plurality of adjacent subframes on the specific cell which are most recently present before the downlink transmission.

All of the downlink channel(s) may be included in first one subframe among the plurality of adjacent subframes on the specific cell.

All of the downlink channel(s) may be included in first two subframes among the plurality of adjacent subframes and 1st subframe of the first two subframes may be a partial subframe.

The contention window may be constituted by a plurality of slots, the random time in the contention window may correspond to N slots, and N slots may be randomly generated in the contention window size.

In the case of the reference value, 0<reference value<1 or 0%<reference value<100%.

The specific cell may be an unlicensed cell and the plurality of HARQ-ACK responses may be received from a plurality of user equipments through a licensed cell.

Still another exemplary embodiment of the present invention provides a method for performing downlink transmission in a specific cell by a base station in a cellular wireless communication system, the method including: receiving a plurality of hybrid automatic repeat request acknowledgment (HARQ-ACK) responses for downlink transmission(s) in a reference subframe of the specific cell; setting a contention window size for a transmission in the specific cell; selecting a random number N within the contention window size; and performing, when a channel of the specific cell is idle for at least N slot periods, a downlink transmission on the channel, wherein the setting a contention window size includes increasing the contention window size to a next higher allowed value and maintaining the increased value when a ratio of negative acknowledgement (NACK) among the plurality of HARQ-ACK responses is equal to or more than a reference value, and setting the contention window size to a minimum value when the ratio of the NACK among the plurality of HARQ-ACK responses is less than the reference value.

In addition, Still another exemplary embodiment of the present invention provides a base station used in a cellular wireless communication system, the base station including: a wireless communication module; and a processor, wherein the processor is configured to receive a plurality of hybrid automatic repeat request acknowledgment (HARQ-ACK) responses for downlink transmission(s) in a reference subframe of the specific cell, set a contention window size for a transmission in the specific cell, select a random number N within the contention window size, and perform, when a channel of the specific cell is idle for at least N slot periods, a downlink transmission on the channel, wherein the contention window size is increased to a next higher allowed value and maintained at the increased value when a ratio of negative acknowledgement (NACK) among the plurality of HARQ-ACK responses is equal to or more than a reference value, and wherein the contention window size is set to a minimum value when the ratio of the NACK among the plurality of HARQ-ACK responses is less than the reference value.

A contention window size for a next downlink transmission of the base station is set based on the maintained contention window size.

The reference subframe includes a starting subframe of a most recent transmission by the base station.

When the starting subframe is a partial subframe, the reference subframe further includes a next subframe of the starting subframe.

The contention window size is set to any one of a plurality of contention window size values included in a set of allowed contention window sizes of a channel access priority class of the corresponding downlink transmission.

When the contention window size is a maximum contention window size, the next higher allowed value is the maximum contention window size.

When the plurality of HARQ-ACK responses includes discontinuous transmission (DTX), the ratio of the NACK further includes a ratio of the DTX.

The specific cell is an unlicensed cell and the plurality of HARQ-ACK responses are received from a plurality of user equipments through a licensed cell.

Still yet another exemplary embodiment of the present invention provides a channel access method for data transmission of a wireless communication apparatus, the method including: performing a first channel access procedure for transmitting a first set of subframes; and performing a second channel access procedure for transmitting a second set of subframes subsequent to the first set of subframes, wherein the second channel access procedure is performed based on a result of comparison between a first channel access priority class value used for the ongoing first channel access procedure and a second channel access priority class value indicated in the second channel access procedure.

In addition, still yet another exemplary embodiment of the present invention provides a wireless communication apparatus which performs channel access for data transmission, the apparatus including: a communication module; and a processor, wherein the processor is configured to perform a first channel access procedure for transmitting a first set of subframes, and perform a second channel access procedure for transmitting a second set of subframes subsequent to the first set of subframes, wherein the second channel access procedure is performed based on a result of comparison between a first channel access priority class value used for the ongoing first channel access procedure and a second channel access priority class value indicated in the second channel access procedure.

The first channel access priority class value is less than the second channel access priority class value, the wireless communication apparatus terminates the ongoing first channel access procedure and performs the second channel access procedure based on the second channel access priority class.

A listen before talk (LBT) parameter of the second channel access procedure is determined based on the second channel access priority class.

The LBT parameter includes a contention window size for transmission in a specific cell, and a contention window size of the second channel access procedure is set to any one of a plurality of contention window size values included in a set of allowed contention window sizes of the second channel access priority class.

When the first channel access priority class value is equal to or larger than the second channel access priority class value, the wireless communication apparatus performs the second channel access procedure using the ongoing first channel access procedure.

A set of subframes includes one or more consecutive subframes.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently transmitting a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DETAILED DESCRIPTION OF THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
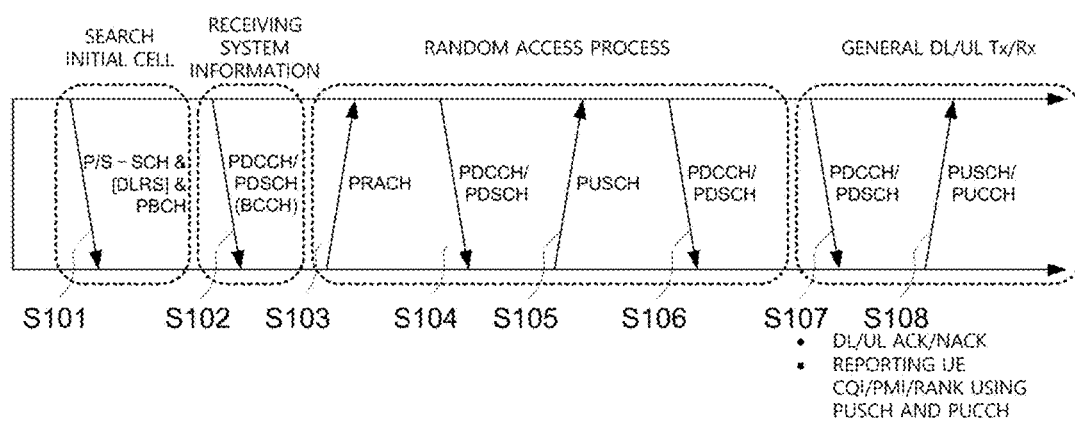
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). First, the user equipment may transmit a preamble through a physical random access channel (PRACH) (S103) and receive a response message to the preamble through the PDCCH and the PDSCH corresponding thereto (S104). When the user equipment receives a valid random access response message, the user equipment transmits data including its own identifier and the like to the base station using an uplink grant (S105). Next, the user equipment waits for reception of the PDCCH as an indication of the base station for a contention resolution. When the user equipment receives the PDCCH through its identifier (S106), the random access procedure is terminated.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
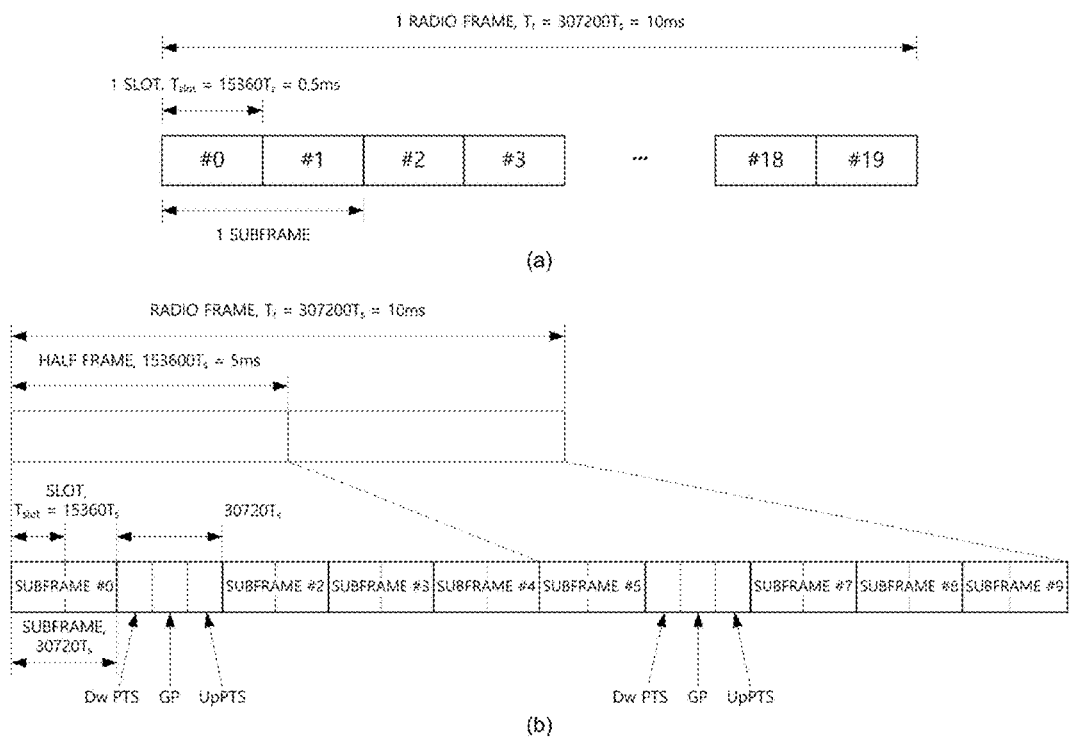
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. Within one radio frame, 20 slots may be sequentially numbered from 0 to 19. Each slot has length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. A TDD radio frame further includes a special subframe for downlink and uplink switching. The special subframe consists of a downlink pilot time slot (DwPTS), a guard period (GP), and an uplink pilot time slot (UpPTS).

Figure 3:
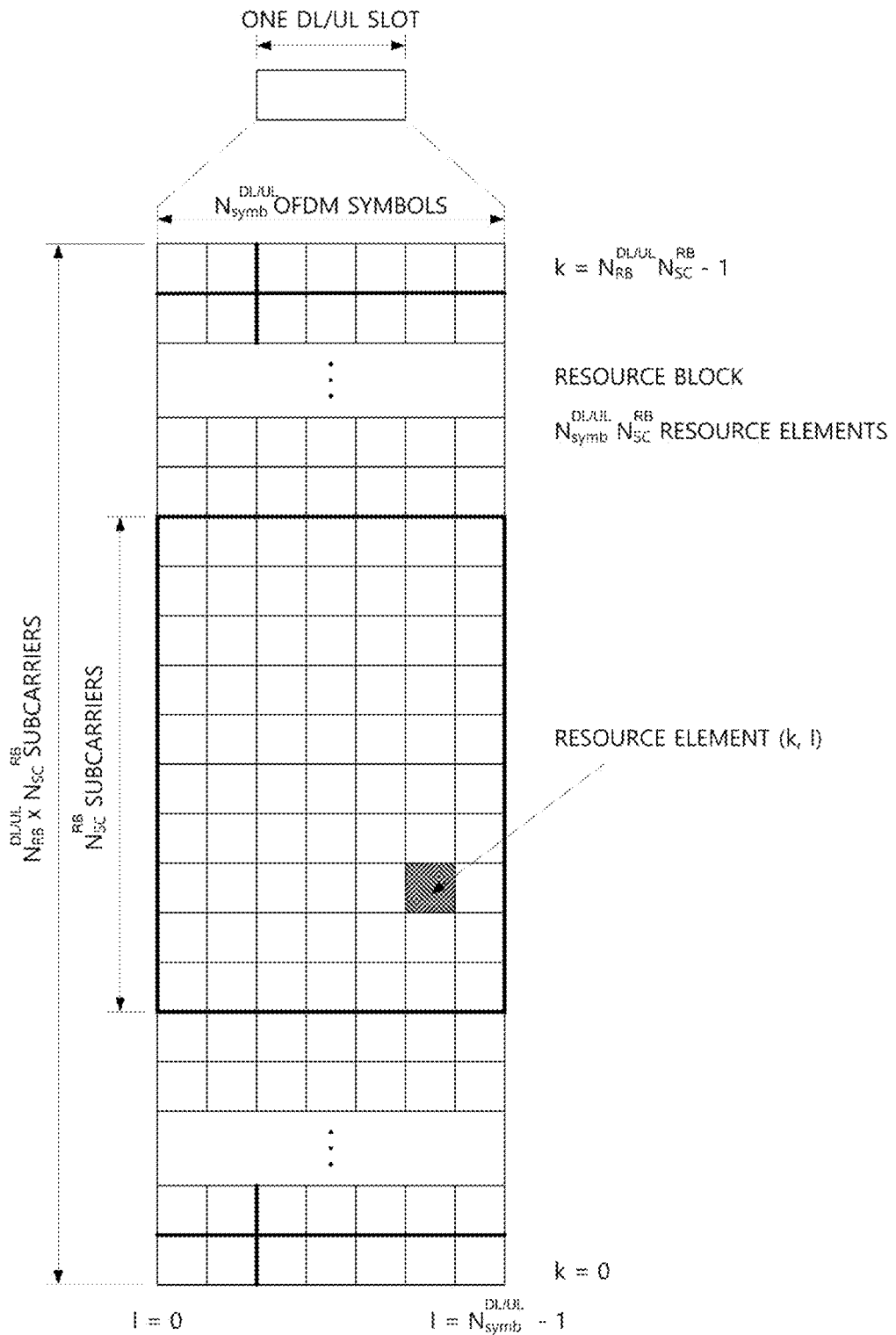
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb}*N^{RB}_{sc}$ resource elements.

The resource of the slot may be expressed as a resource grid constituted by $N^{DL/UL}_{RB}*N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB}*N^{RB}_{sc}-1$ in the frequency domain and l represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
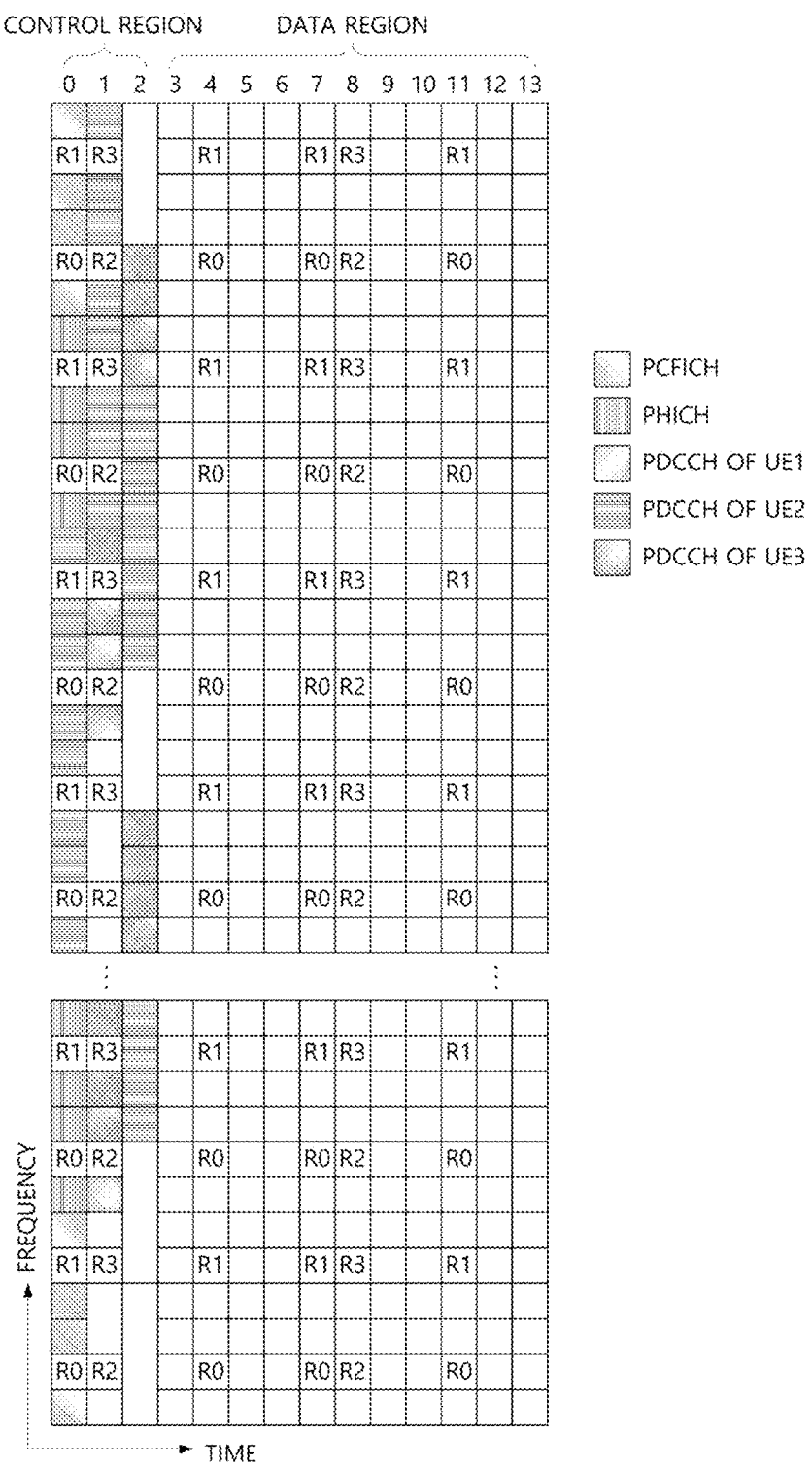
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1(alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
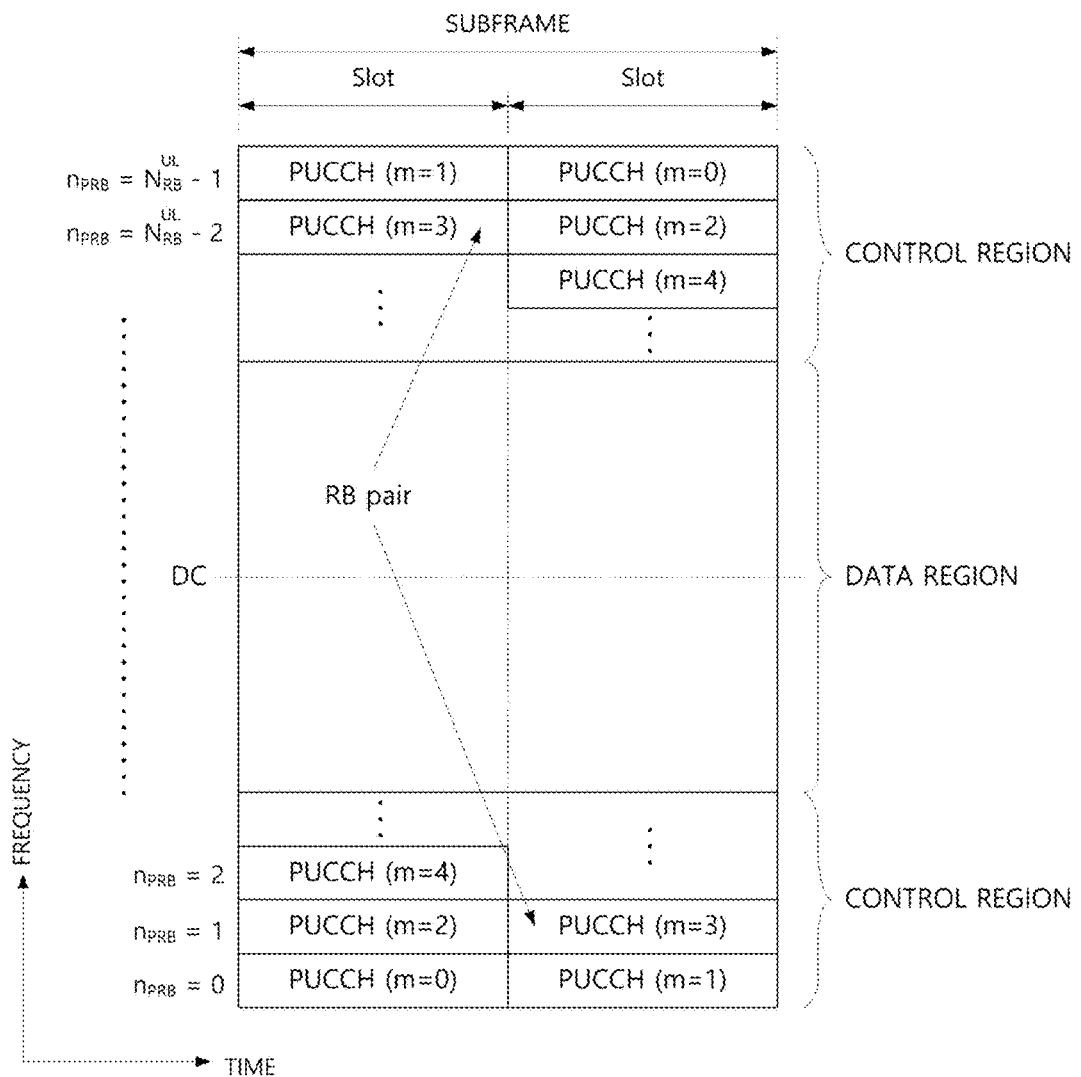
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
|---|---|
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
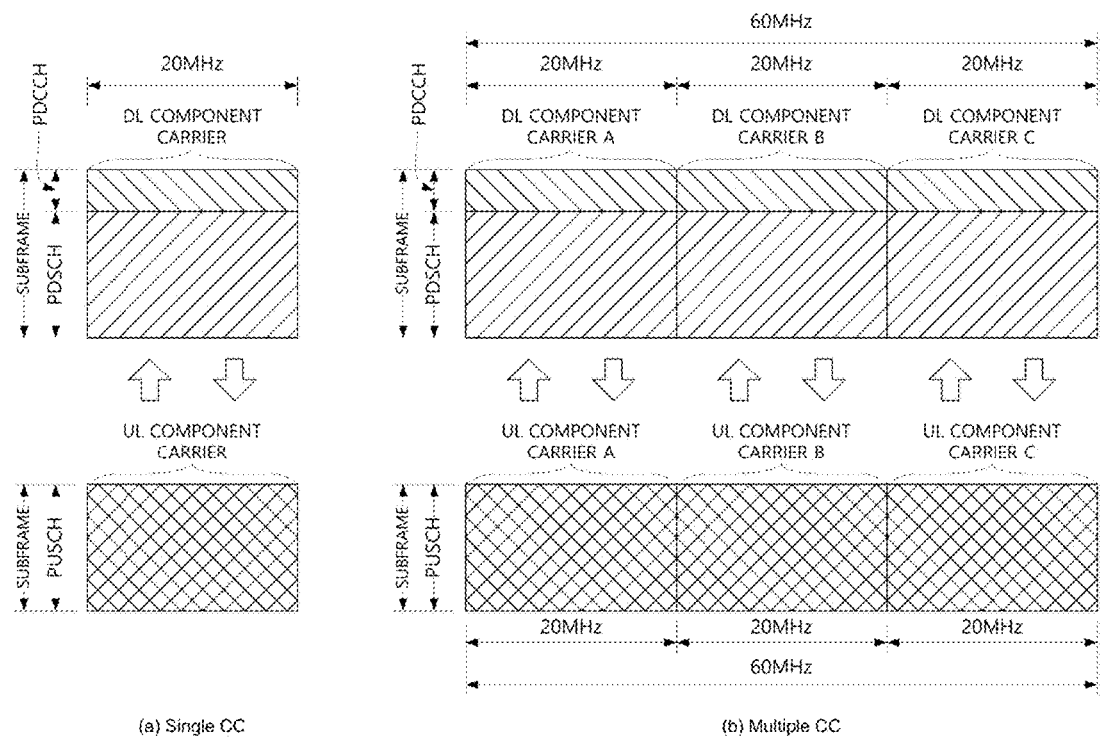
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
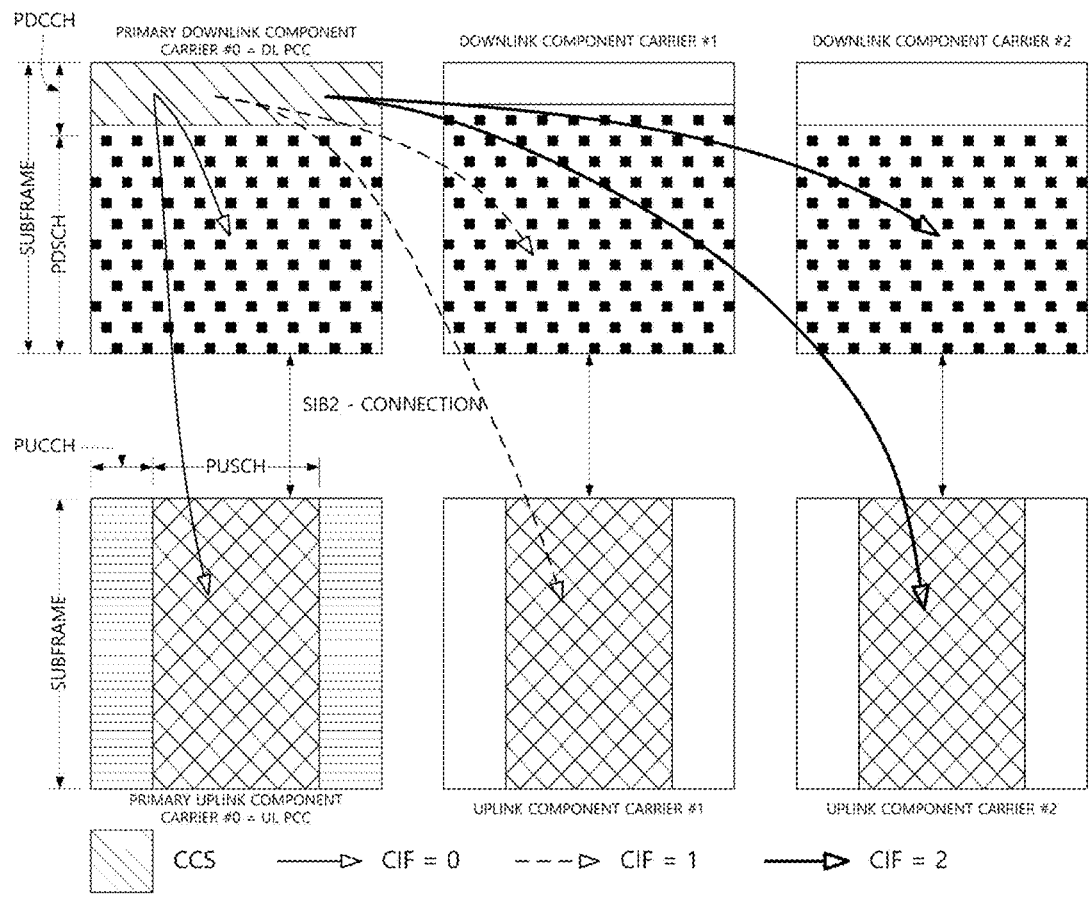
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
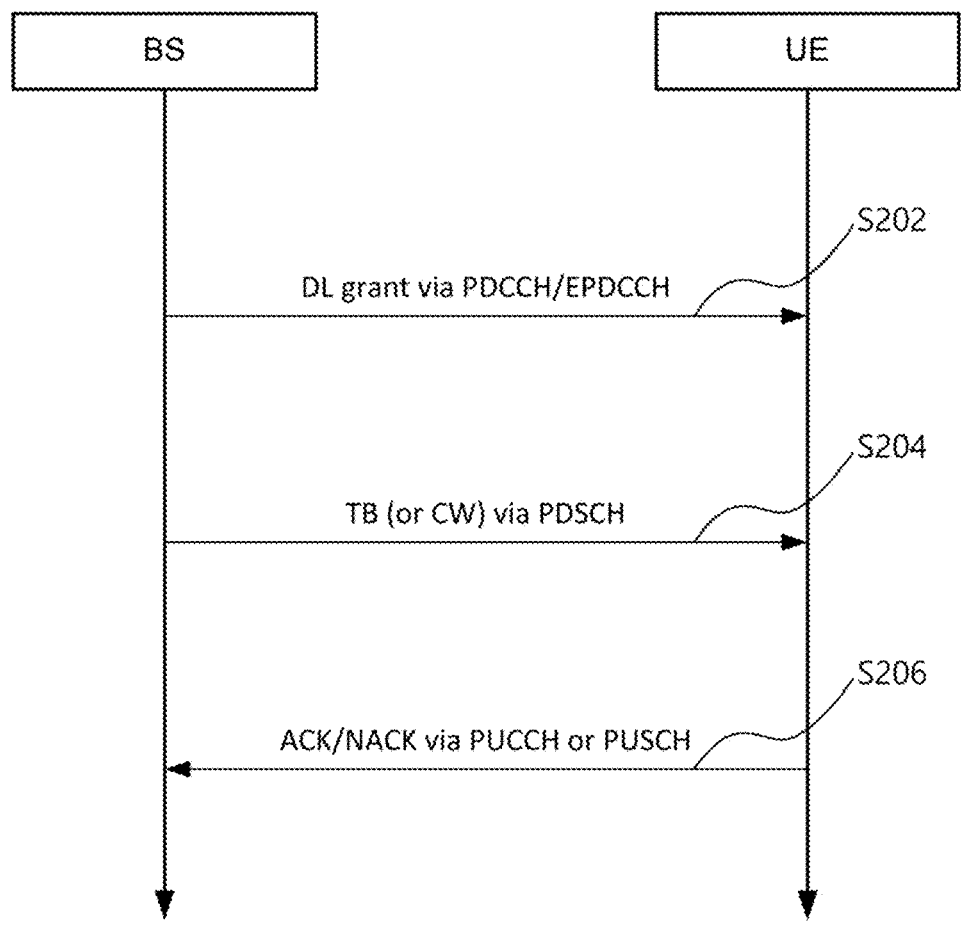
FIG. 8 illustrates an acknowledgement/negative acknowledgement (ACK/NACK) transmitting process in a single cell situation.

FIG. 8 illustrates an ACK/NACK transmitting process in a single cell situation. The ACK/NACK is fed back to (i) the PDSCH scheduled by the PDCCH, (ii) the PDSCH (that is, SPS PDSCH) without the PDCCH corresponding to the PDSCH, and (iii) the PDCCH indicating SPS release. In FIG. 8, a process of transmitting the ACK/NACK to (i) the PDSCH is illustrated. The PDCCH includes the EPDCCH.

Referring to FIG. 8, the user equipment receives the PDCCH (alternatively, EPDCCH) in subframe #n-k (S202) and receive the PDSCH indicated by the PDCCH in the same subframe (S204). The PDCCH transmits the scheduling information (that is, DL grant) and the PDSCH transmits one or a plurality of (e.g., two) transport blocks (TBs) (alternatively, codeword (CW)) according to a transmission mode. Thereafter, the user equipment may transmit the ACK/NACK for the PDSCH (that is, transport block) in subframe #n (S206). ACK/NACK 1 bit may be transmitted in response to a single transport block and ACK/NACK 2 bits may be transmitted in response to two transport blocks. The ACK/NACK is basically transmitted through the PUCCH, but when the PUSCH is transmitted in subframe #n, the ACK/NACK may be transmitted through the PUSCH. k represents a time interval between the DL subframe and the UL subframe. In the FDD, k=4 and in the TDD, k may be given by a downlink association set index (DASI). The ACK/NACK means the HARQ-ACK. The HARQ-ACK response includes ACK, NACK, DTX, and NACK/DTX.

When a plurality of cells are configured for the user equipment, ACK/NACK information may be transmitted by using PUCCH format 3 or a channel selection scheme based on PUCCH format 1b.

An ACK/NACK payload for PUCCH format 3 is configured for each cell and thereafter, concatenated according to a cell index order. The ACK/NACK payload is configured with respect to all cells configured to the user equipment regardless of actual data transmission in each cell. Each bit in the ACK/NACK payload indicates HARQ-ACK feedback for the corresponding transport block (alternatively, codeword). The HARQ/ACK feed-back indicates ACK or NACK, and DTX is processed as the NACK. The NACK and the DTX have the same HARQ-ACK feed-back value. If necessary, the base station may distinguish the NACK and the DTX by using information on the control channel which the base station transmits to the user equipment.

The channel selection scheme based on the PUCCH format 1b may be set for transmitting the ACK/NACK when two cells are aggregated. In the channel selection scheme based on the PUCCH format 1b, ACK/NACK responses to the plurality of transport blocks (alternatively, codewords) are identified by a combination of a PUCCH resource index and a bit value.

Table 2 shows mapping between HARQ-ACK(j) and the transport block (TB) of each cell in the channel selection scheme based on the PUCCH format 1b. Tables 3 to 5 show mapping of ACK, NACK, DTX, and NACK/DTX when A=2 to 4, respectively. The user equipment selects one PUCCH resource corresponding to an HARQ-ACK set from A PUCCH resources and transmits a 2-bit value corresponding to the HARQ-ACK set by using the selected PUCCH resource. The DTX is transmitted singly or as the NACK/DTX. When the NACK/DTX is transmitted, if necessary, the base station may distinguish the NACK and the DTX by using the information on the control channel which the base station transmits to the user equipment.

TABLE 2

| A | HARQ-ACK(0) | HARQ-ACK(1) | HARQ-ACK(2) | HARQ-ACK(3) |
|---|---|---|---|---|
| 2 | TB1 PRIMARY CELL | TB1 SECONDARY CELL | NA | NA |
| 3 | TB1 SERVING CELL1 | TB2 SERVING CELL1 | TB1 SERVING CELL2 | NA |
| 4 | TB1 PRIMARY CELL | TB2 PRIMARY CELL | TB1 SECONDARY CELL | TB2 SECONDARY CELL |

TABLE 3

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | NO TRANSMISSION | |

TABLE 4

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | NO TRANSMISSION | |

TABLE 5

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | NO TRANSMISSION | |

Transmission Methods in an Unlicensed Band

Figure 9:
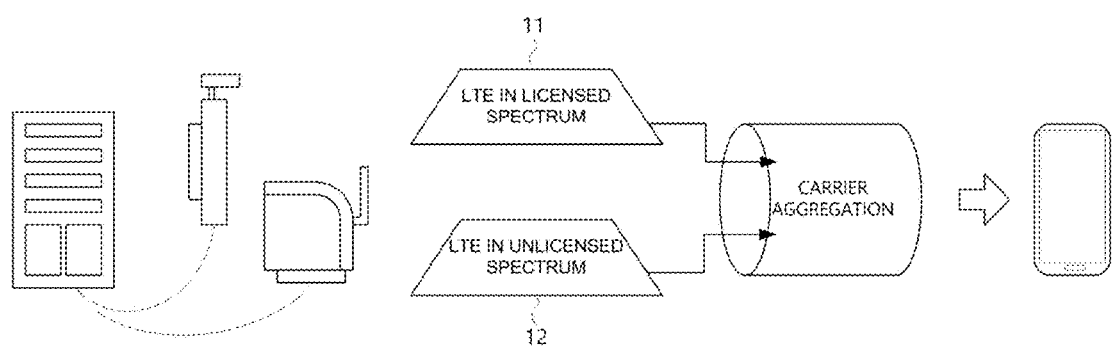
FIG. 9 illustrates a licensed assisted access (LAA) service environment.

FIG. 9 illustrates a licensed assisted access (LAA) service environment.

Referring to FIG. 9, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed band is referred to as LTE-licensed (LTE-L) and the LTE technology in the unlicensed band is referred to as LTE-unlicensed (LTE-U) or LAA.

Figure 10:
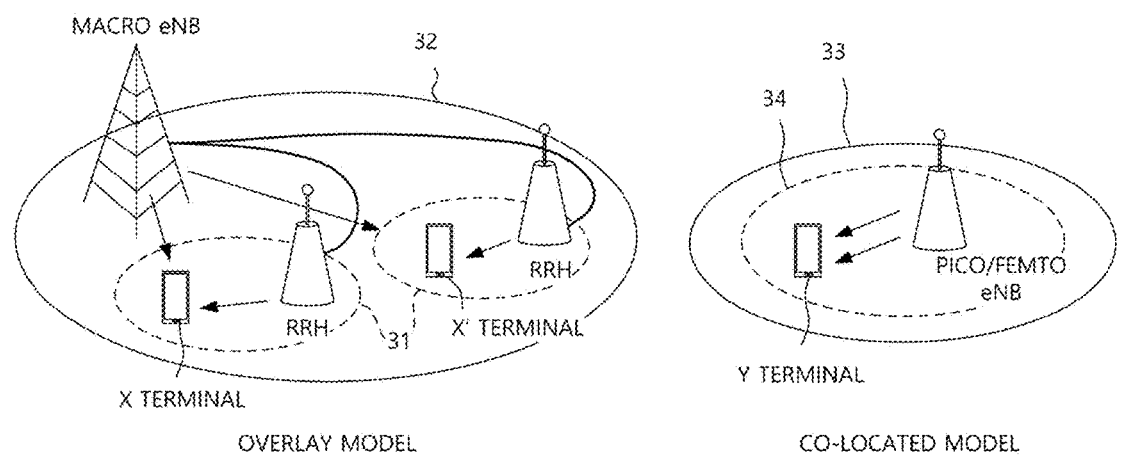
FIG. 10 illustrates a layout scenario of a user equipment and a base station in an LAA service environment.

FIG. 10 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model or a co-located model.

In the overlay model, a macro base station may perform wireless communication with an X UE and an X' UE in a macro area (32) by using a licensed band carrier and be connected with multiple radio remote heads (RRHs) through an X2 interface. Each RRH may perform wireless communication with an X UE or an X' UE in a predetermined area (31) by using an unlicensed band carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed band carrier and the unlicensed band carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Thus, conventional equipments may determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 11:
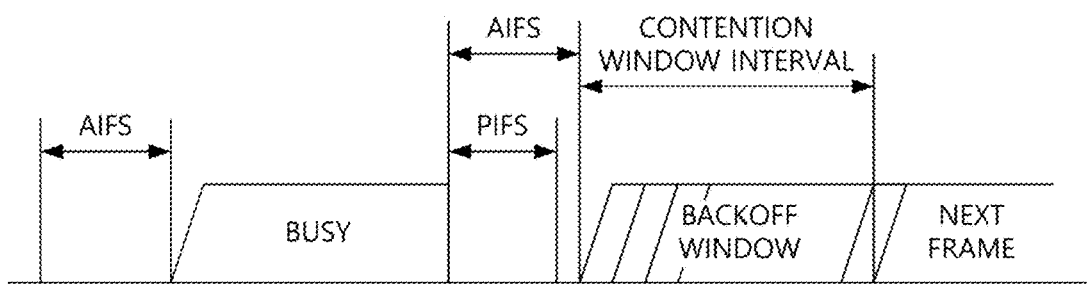
FIG. 11 illustrates a communication scheme that operates in an unlicensed band in the related art.

FIG. 11 illustrates a communication scheme (e.g., wireless LAN) that operates in an unlicensed band in the related art. Since most devices that operate in the unlicensed band operate based on listen-before-talk (LBT), a clear channel assessment (CCA) that senses a channel before data transmission is performed.

Referring to FIG. 11, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS is doubled. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS is doubled.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Figure 12:
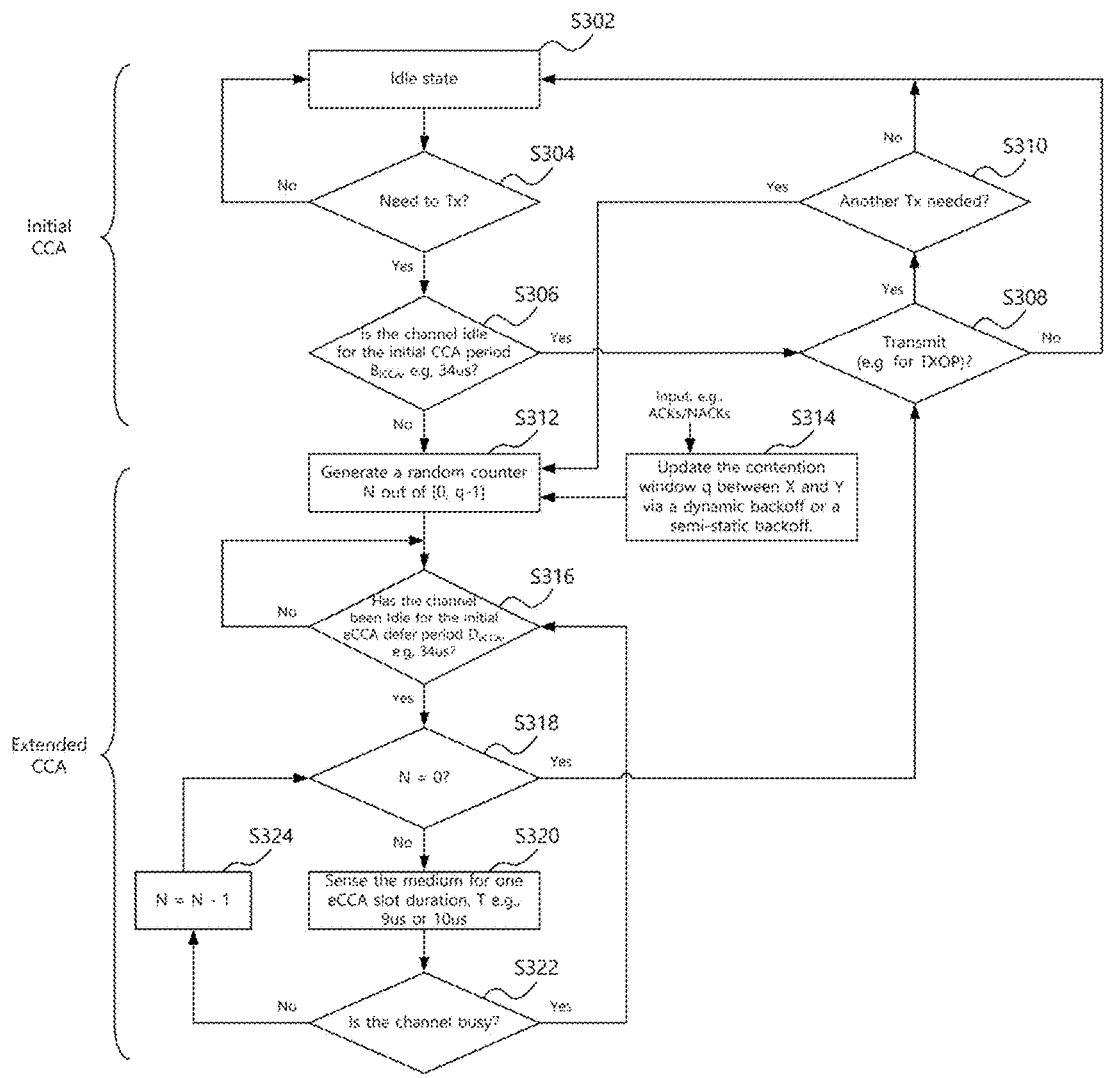
FIGS. 12 and 13 illustrate a listen-before-talk (LBT) process for DL transmission.
Figure 13:
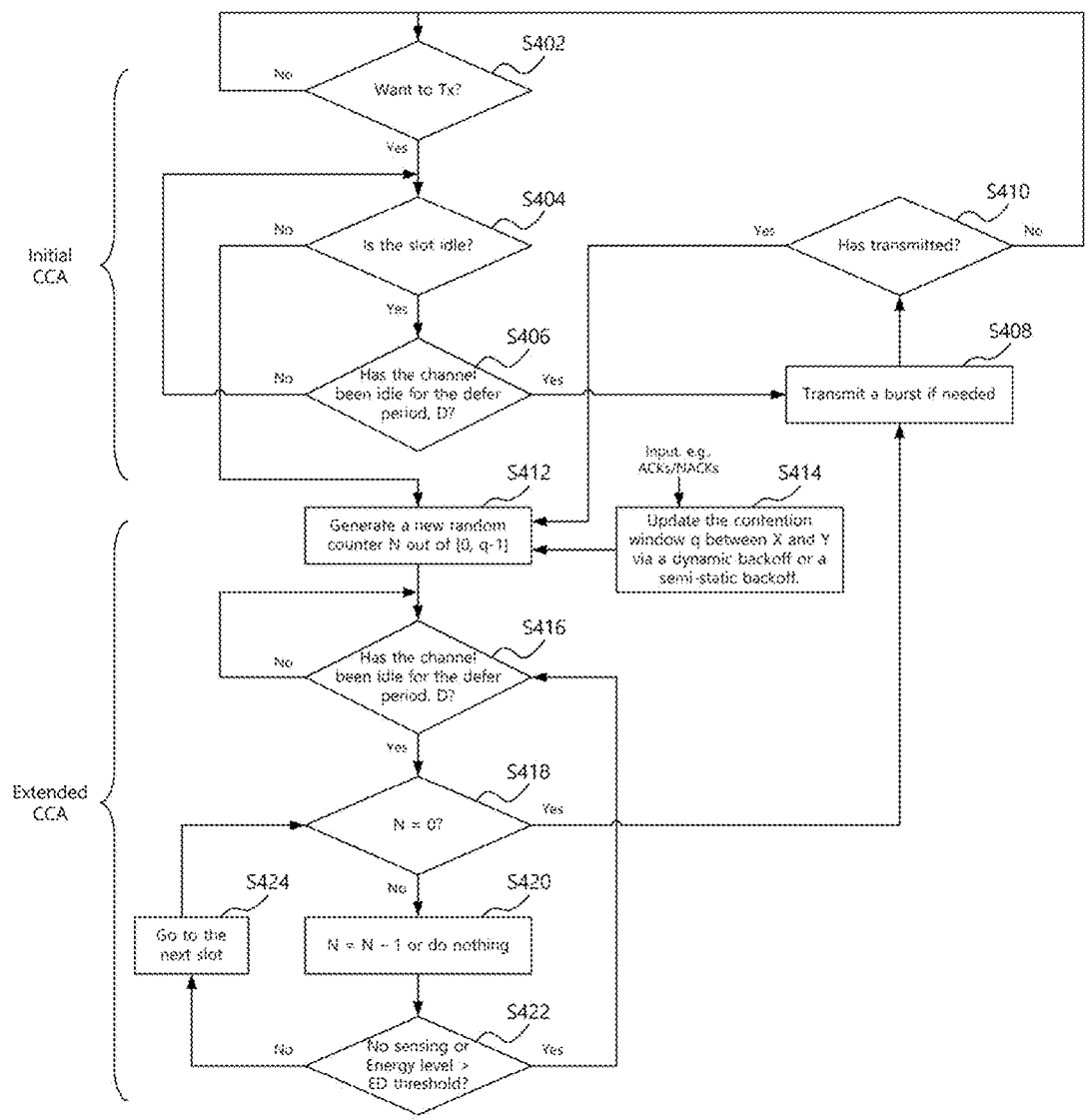

Category 1: No LBT
  An LBT procedure by a Tx entity is not performed.
Category 2: LBT without random back-off
  A time interval in which the channel needs to be sensed in an idle state before the Tx entity performs a transmission on the channel is decided. The random back-off is not performed.
Category 3: LBT with random back-off with a CW of fixed size
  LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
Category 4: LBT with random back-off with a CW of variable size
  LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel FIGS. 12 to 13 illustrate a DL transmission process based on the category 4 LBT. The category 4 LBT may be used to guarantee fair channel access with Wi-Fi. Referring to FIGS. 12 to 13, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or DL transmission is performed just before. That is, it is determined whether the channel is idle through the ICCA, and data transmission is performed after the ICCA period. If the interference signal is detected and data transmission fails, a data transmission timing can be obtained through a defer period+back-off counter after setting a random back-off counter.

Referring to FIG. 12, a signal transmitting process may be performed as follows.

Initial CCA
  S302: The base station verifies that the channel is idle.

S304: The base station verifies whether the signal transmission is required. When the signal transmission is not required, the process returns to S302 and when the signal transmission is required, the process proceeds to S306.

S306: The base station verifies whether the channel is idle for an ICCA defer period ($B_{CCA}$). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 μs. When the channel is idle for the ICCA defer period, the base station may perform the signal transmitting process (S308). When it is determined that the channel is busy during the ICCA defer period, the process proceeds to S312 (ECCA).

S308: The base station may perform the signal transmitting process. When the signal transmission is not performed, the process proceeds to S302 (ICCA) and when the signal transmission is performed, the process proceeds to S310. Even in the case where a back-off counter N reaches 0 in S318 thereby S308 is performed, when the signal transmission is not performed, the process proceeds to S302 (ICCA) and when the signal transmission is performed, the process proceeds to S310.

S310: When additional signal transmission is not required, the process proceeds to S302 (ICCA) and when the additional signal transmission is required, the process proceeds to S312 (ECCA).

Extended CCA

S312: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S314. Thereafter, the base station proceeds to S316.

S314: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S316: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 μs. When the channel is idle for the ECCA defer period, the base station proceeds to S318. When it is determined that the channel is busy during the ECCA defer period, the base station repeats S316.

S318: The base station verifies whether N is 0. When N is 0, the base station may perform the signal transmitting process (S308). In this case, (i.e., N=0), the base station may not immediately perform transmission and performs CCA check for at least one slot to continue the ECCA process. When N is not 0 (that is, N>0), the process proceeds to S320.

S320: The base station senses the channel during one ECCA slot interval (T). The ECCA slot size may be 9 μs or 10 μs and an actual sensing time may be at least 4 μs.

S322: When it is determined that the channel is idle, the process proceeds to S324. When it is determined that the channel is busy, the process returns to S316. That is, one ECCA defer period is applied again after the channel is idle and N is not counted during the ECCA defer period.

S324: N is decreased by 1 (ECCA countdown).

FIG. 13 is substantially the same as/similar to the transmitting process of FIG. 12 and is different from FIG. 12 according to an implementation scheme. Therefore, detailed matters may be described with reference to contents of FIG. 12.

Initial CCA

S402: The base station verifies whether the signal transmission is required. When the signal transmission is not required, S402 is repeated and when the signal transmission is required, the process proceeds to S404.

S404: The base station verifies whether the slot is idle. When the slot is idle, the process proceeds to S406 and when the slot is busy, the process proceeds to S412 (ECCA). The slot may correspond to the CCA slot in FIGS. 12.

S406: The base station verifies whether the channel is idle for a defer period (D). D may correspond to the ICCA defer period in FIG. 12. When the channel is idle for the defer period, the base station may perform the signal transmitting process (S408). When it is determined that the channel is busy during the defer period, the process proceeds to S404.

S408: The base station may perform the signal transmitting process if necessary.

S410: When the signal transmission is not performed, the process proceeds to S402 (ICCA) and when the signal transmission is performed, the process proceeds to S412 (ECCA). Even in the case where the back-off counter N reaches 0 in S418 thereby S408 is performed, when the signal transmission is not performed, the process proceeds to S402 (ICCA) and when the signal transmission is performed, the process proceeds to S412 (ECCA).

Extended CCA

S412: The base station generates the random number N in the CW. N is used as the counter during the back-off process and generated from [0, q−1]. The CW size (CWS) may be defined as q and be variable in S414. Thereafter, the base station proceeds to S416.

S414: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S416: The base station verifies whether the channel is idle for the defer period (D). D may correspond to the ECCA defer period in FIG. 12. D in S406 and D in S416 may be the same as each other. When the channel is idle for the defer period, the base station proceeds to S418. When it is determined that the channel is busy during the defer period, the base station repeats S416.

S418: The base station verifies whether N is 0. When N is 0, the base station may perform the signal transmitting process (S408). In this case, (N=0), the base station may not immediately perform transmission and performs CCA check during at least one slot to continue the ECCA process. When N is not 0 (that is, N>0), the process proceeds to S420.

S420: The base station selects one of an operation of decreasing N by 1 (ECCA count-down) and an operation of not decreasing N (self-deferral). The self-deferral operation may be performed according to implementation/selection of the base station. The base station does not perform sensing for energy detection and not perform even ECCA countdown in the self-deferral.

S422: The base station may select one of the operation not performing sensing for energy detection and the energy detecting operation. When the sensing for the energy detection is not performed, the process proceeds to S424. When the energy detecting operation is performed, if an energy level is equal to or lower than an energy detection threshold (that is, idle), the process proceeds to S424. If the energy level is higher than the energy detection threshold (that is, busy), the process returns to 5416. That is, one defer period is applied again after the channel is idle and N is not counted during the defer period.

S424: The process proceeds to S418.

Figure 14:
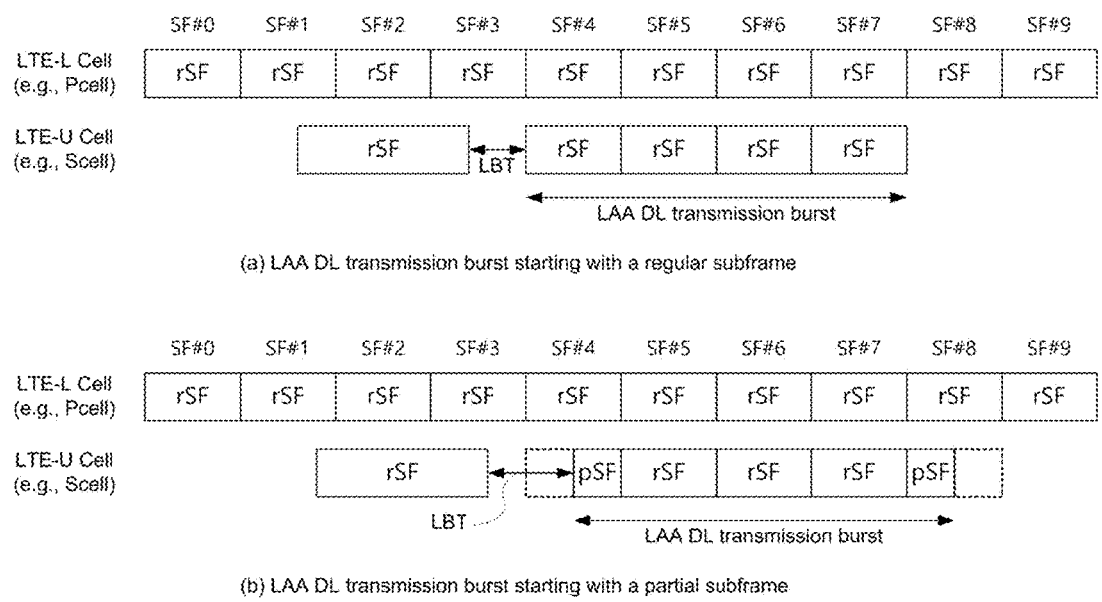
FIG. 14 illustrates DL transmission in an unlicensed band.

FIG. 14 illustrates an example in which a base station performs DL transmission in an unlicensed band. The base station may aggregate cells (for convenience, LTE-L cell) of one or more licensed bands and cells (for convenience, LTE-U cell) of one or more unlicensed bands. In FIG. 14, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the DL transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The DL transmission burst may start with the regular subframe (rSF) as shown in FIG. 14(a) or may start with a partial subframe (pSF) as shown in FIG. 14(b) depending on an LBT situation. pSF may be a part of the subframe and may include a second slot of the subframe. Further, the DL transmission burst may end as rSF or pSF.

Hereinafter, a method for adaptively adjusting the CWS in channel access in the unlicensed band will be proposed. The CWS may be adjusted based on user equipment (UE) feed-back and the UE feedback used for the CWS adjustment may include an HARQ-ACK response and a CQI/PMI/RI. The present invention proposes a method for adaptively controlling the CWS based on the HARQ-ACK response. The HARQ-ACK response includes ACK, NACK, and DTX.

As described with reference to FIG. 11, even in Wi-Fi, the CWS is adjusted based on the ACK. When an ACK feedback is received, the CWS is reset to the minimum value (CWmin) and when the ACK feedback is not received, the CWS is increased. However, in a cellular system (e.g., LTE) a CWS adjusting method considering multiple-access is required.

First, terms are defined as described below in order to describe the present invention.

Set of HARQ-ACK feedback values (HARQ-ACK feedback set): It means HARQ-ACK feedback value(s) used for updating/adjusting the CWS. The HARQ-ACK feedback set corresponds to HARQ-ACK feedback value(s) that is decoded and usable at a time when the CWS is decided. The HARQ-ACK feedback set includes HARQ-ACK feedback value(s) for one or more DL (channel) transmission (e.g., PDSCH) on the unlicensed band (e.g., LTE-U cell). The HARQ-ACK feedback set may include HARQ-ACK feedback value(s) for the DL (channel) transmission (e.g., PDSCH), for example, a plurality of HARQ-ACK feedback values fed back from a plurality of user equipments. The HARQ-ACK feedback value may represent receiving response information for the transport block or PDSCH, and represent ACK, NACK, DTX, and NACK/DTX. According to a context, the HARQ-ACK feedback value may be used mixedly with the HARQ-ACK value/bit/response/information, and the like.

Reference window: It means a time interval at which the DL transmission (e.g., PDSCH) corresponding to the HARQ/ACK feedback set is performed in the unlicensed band (e.g., LTE-U cell). The reference window may be defined by the unit of SF. The reference window will be described/proposed below in more detail.

In the LTE, according to the HARQ-ACK feedback scheme or a PUCCH format, an HARQ-ACK value may represent only ACK and NACK or further represent DTX. For example, when PUCCH format 3 is configured as the HARQ-ACK feedback method, the HARQ-ACK value may represent only ACK and NACK. On the contrary, when a channel selection scheme using PUCCH format 1b is configured as the HARQ-ACK feedback method, the HARQ-ACK value may represent ACK, NACK, DTX, and NACK/DTX.

Therefore, in the present invention, a case in which only ACK and e NACK are considered as the HARQ-ACK response, and a case in which the DTX is further considered as the HARQ-ACK response are separately described. Basic matters are common to each other.

Case 1 the Case of Considering Only ACK and NACK in Response to HARQ-ACK HARQ-ACK The following methods may be considered as a method of adjusting the CWS based on the HARQ-ACK feedback set. Options 1 to 3 and Alts 1 to 3 may be combined.

Option 1: If HARQ-ACK feedback values for the reference window all are determined as the NACK, the CWS is increased, and if not (that is, if at least one ACK is present), the CWS may be reset to a minimum value.

Option 2: If at least one of the HARQ-ACK feedback values for the reference window is determined as the NACK, the CWS is increased, and if not (that is, if all of the values are the ACKs), the CWS may be reset to a minimum value.

Option 3: If among the HARQ-ACK feedback values for the reference window, the NACK is determined as at least Z % (0<Z<100), the CWS is increased, and if not, the CWS may be reset to a minimum value. As an example, Z may be 50 or 80. That is, if the ratio (hereinafter, referred to as Y %) of the NACK in the HARQ-ACK feedback is equal to or more than a reference value, the CWS is increased, and when the ratio of NACK is less than the reference value, the CWS may be reset to the minimum value. The reference value may be 0<reference value<1, or 0% <reference value<100% according to a unit. Equally, if among the HARQ-ACK feedback values for the reference window, the ACK is determined as a value less than X % (X=100−Z), the CWS is increased, and if not, the CWS may be reset to a minimum value. As an example, X may be 20 or 50.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Alt 1: A case where the maximum CWS, CW_max is used for K continuous ECCAs. Herein, K is fixed to one of 1, 2, and 3, or may be selected within {1, . . . , 8} by the base station.

Alt 2: A case where there is no DL transmission by the base station for at least T period. T is a pre-determined value or a configurable value.

Alt 3: A case where the maximum HARQ retransmission is used in K continuous ECCAs. Herein, K is fixed to one of 1, 2, and 3, or may be selected within {1, . . . , 8} by the base station.

The reference window may be (1) a single subframe, (2) multi (for example, two) subframes, or (3) all subframes where the HARQ-ACK feedback is usable, in the last DL transmission burst (that is, the latest DL transmission burst on the unlicensed band).

Herein, (1) the single subframe may be the first or last subframe of the last DL transmission burst. The single subframe may be a regular subframe rSF or a partial subframe pSF. However, in the partial subframe, the number of user equipments which may be served by the base station is limited. Accordingly, when the first or last subframe of the last DL transmission burst is the partial subframe, the base station may efficiently adjust the CWS according to channel collision or interference by defining a HARQ-ACK feedback set based on the HARQ-ACK feedback value of the user equipment(s) corresponding to the regular subframe. For example, when the first or last subframe of the last DL transmission burst is the partial subframe, the reference window may be the multiple subframes.

Herein, (2) the multi subframes may be a first multiple subframe or the last multiple subframe in the last DL transmission burst. For example, when the number of multiple subframes is two, the multiple subframes may be first two subframes of the last DL transmission burst, that is, the 1st subframe that is the partial subframe or the regular subframe and the 2nd subframe that is the regular subframe. Further, the multiple subframes may be the last two subframes, that is, the 1st subframe that is the regular subframe and the 2nd subframe that is the partial subframe or the regular subframe.

Case 2-1: Case of Additionally Considering DTX as HARQ-ACK Response

Hereinafter, a method of adjusting the CWS by considering ACK, NACK, and DTX, as the HARQ-ACK response transmitted from the user equipment, will be described. In self-carrier scheduling, that is, in the case where the DL transmission (for example, the PDSCH) for the carrier in the unlicensed band is performed through a control channel (for example, (E)PDCCH) transmitted on the same unlicensed band carrier, the HARQ feedback which may be transmitted by the user equipment with respect to the DL transmission of the unlicensed band may include ACK, NACK, DTX and NACK/DTX. Herein, since the DTX corresponds to a case where the DL transmission is unsuccessful by a hidden node and the like in the unlicensed band carrier, the DTX may be used for CWS adjustment together with the NACK. Further, the DTX is one of methods in which the user equipment notifies a case where the user equipment may not decode the corresponding control channel to the base station even though the base station transmits the control channel (for example, the (E)PDCCH) including scheduling information to the user equipment. The DTX may be determined only by the HARQ-ACK feedback value or determined by considering the HARQ-ACK feedback value and an actual scheduling situation. For convenience, a self-carrier scheduling operation is assumed.

The following methods may be considered as a method of adjusting the CWS based on the HARQ-ACK feedback set. Methods A-1 to A-4 and methods B-1 to B-3 may be combined.

Method A-1: In the case where all of the HARQ-ACK feedback values for the reference window are NACK, all of the HARQ-ACK feedback values are determined as DTX, or all of the HARQ-ACK feedback values are NACK/DTX, the CWS is increased, and if not (that is, if at least one ACK is present), the CWS may be reset to a minimum value.

Method A-2: If at least one of the HARQ-ACK feedback values for the reference window is determined as the NACK, the DTX or the NACK/DTX, the CWS is increased, and if not (that is, if all of the values are the ACKs), the CWS may be reset to a minimum value.

Method A-3: If among the HARQ-ACK feedback values for the reference window, NACK or DTX is determined as at least Z % (0<Z<100), the CWS is increased, and if not, the CWS may be reset to a minimum value. As an example, Z may be 50 or 80. Herein, the NACK or the DTX of at least Z % means that either the NACK or the DTX is added, i.e., a sum of NACK, DTX and NACK/DTX, to become at least Z %. That is, NACK/DTX and DTX may be treated equally with NACK. Accordingly, if a ratio (hereinafter, referred to as Y %) of NACK or DTX in the HARQ-ACK feedback is equal to or more than a reference value, the CWS is increased, and when the ratio of NACK or DTX is less than the reference value, the CWS may be reset to the minimum value. The reference value may be 0<reference value<1, or 0%<reference value<100% according to a unit. Equally, if among the HARQ-ACK feedback values for the reference window, the ACK is determined as a value less than X % (X=100−Z), the CWS is increased, and if not, the CWS may be reset to a minimum value. As an example, X may be 20 or 50.

Method A-4: In the case where all of the HARQ-ACK feedback values for the reference window are determined as the DTX, the base station increases the CWS by considering that all of the control channels PDCCH/EPDCCH are not received by the user equipment or the decoding of both the PDCCH and the EPDCCH is unsuccessful by interference of other nodes, and if not (that is, in the case where all of the HARQ-ACK feedback values are not determined as the DTX), the CWS may be adjusted according to the methods A-1 to A-3.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Method B-1: A case where the maximum CWS CW_max is used for K continuous ECCAs. Herein, K is fixed to one of 1, 2, and 3, or may be selected within {1, . . . , 8} by the base station.

Method B-2: A case where there is no DL transmission by the base station for at least T period. T is a predetermined value or a configurable value.

Method B-3: A case where the maximum HARQ retransmission is used within K continuous ECCAs. Herein, K is fixed to one of 1, 2, and 3, or may be selected within {1, . . . , 8} by the base station.

The reference window may be (1) a single subframe, (2) multi (for example, two) subframes, or (3) all subframes where the HARQ-ACK feedback is usable in the last DL transmission burst (that is, the latest DL transmission burst on the unlicensed band). The detailed contents may refer to the contents described in Case 1.

Case 2-2: Case of Additionally Considering DTX as HARQ-ACK Response

Hereinafter, another example of the method of adjusting the CWS by considering ACK, NACK, and DTX, as the HARQ-ACK response transmitted from the user equipment, will be described. In self-carrier scheduling, that is, in the case where the DL transmission (for example, the PDSCH) for the carrier in the unlicensed band is performed through a control channel (for example, (E)PDCCH) transmitted on the same unlicensed band carrier, the HARQ feedback which may be transmitted by the user equipment with respect to the DL transmission in the unlicensed band may include ACK, NACK, DTX and NACK/DTX. Herein, since the DTX corresponds to a case where the DL transmission is unsuccessful by a hidden node and the like in the unlicensed band carrier, the DTX may be used for CWS adjustment together with the NACK. Further, the DTX disclosed herein is one of methods in which the user equipment notifies a case where the user equipment does not decode the corresponding control channel to the base station even though the base station transmits the control channel (for example, the (E)PDCCH) including scheduling information to the user equipment. The DTX may be determined only by the HARQ-ACK feedback value or determined by considering the HARQ-ACK feedback value and an actual scheduling situation. For convenience, a self-carrier scheduling operation is assumed.

The following methods may be considered as a method of adjusting the CWS based on the HARQ-ACK feedback set. Methods C-1 and C-2 and methods D-1 to D-3 may be combined.

Method C-1: In the case where there is the DTX in the HARQ-ACK feedback values for the reference window, a weight value may be applied to the DTX when calculating Y % based on the NACK or the DTX, as the HARQ-ACK feedback, according to the method A-3 of the present invention. In the case where the base station may distinguish the NACK and the DTX and in the case where the user equipment feedbacks the DTX even though the base station transmits a PDSCH related with a control channel PDCCH/EPDCCH, the base station may know that the corresponding user equipment does not receive the control channel PDCCH/EPDCCH. In this case, the base station may recognize that there is a possibility that an interference or hidden node and the like occurs in the corresponding channel Accordingly, when receiving the DTX from the user equipment, the base station may calculate Y % by applying the weight value to the DTX in order to more positively solve the problem generated by the interference or hidden node on the channel. Further, when the NACK/DTX is included in the HARQ-ACK feedback values within the reference window, the base station may apply the methods of the present invention by considering the NACK/DTX as the NACK. Unlike this, when the user equipment feedbacks the NACK/DTX to the base station, it is meaningful that the user equipment notifies to the base station that the HARQ-ACK feedback values may be the DTX. Accordingly, when the NACK/DTX is fed back from the user equipment, the base station may calculate Y % by applying the weight value to the NACK/DTX in the HARQ-ACK feedback set. Values considered as the HARQ-ACK feedback may be ACK, NACK, NACK/DTX, and DTX. As described in the present invention, Y % for adjusting the CWS may be calculated by considering different weight values for the NACK, the NACK/DTX, and the DTX except for the ACK.

Equation 1 represents one example of the method C-1. The method may be similarly expressed by another equation and is not limited by the following Equation.

$$Y\% = \{W\_A*Pr(A) + W\_B*Pr(B) + W\_C*Pr(C)\}*100, \quad \text{[Equation 1]}$$

Herein, Pr(A) represents a probability of the NACK in the reference window, that is, Pr(A)=the number of NACKs/the total number of usable HARQ-ACK feedbacks in the reference window. Herein, Pr(B) represents a probability of the NACK/DTX in the reference window, that is, Pr(B)=the number of NACK/DTXs/the total number of usable HARQ-ACK feedbacks in the reference window. Herein, Pr(C) represents a probability of the DTX in the reference window, that is, Pr(C)=the number of DTXs/the total number of usable HARQ-ACK feedbacks in the reference window. W_A means a weight value for the NACK, W_B means a weight value for the NACK/DTX, and W_C means a weight value for the DTX.

First, W_A=W_B=W_C is a case where the NACK, the NACK/DTX, and the DTX are calculated with the same weight value in the HARQ-ACK feedback set when calculating Y %. W_A<W_B=W_C is a case where the NACK/DTX and the DTX are calculated with a larger weight value than that of the NACK and the NACK/DTX and the DTX are calculated with the same weight value in the HARQ-ACK feedback set when calculating Y %. W_A=W_B<W_C is a case where the NACK and the NACK/DTX are calculated with the same weight value and the DTX is calculated with a larger weight value in the HARQ-ACK feedback set when calculating Y %.

W_A<W_B=W_C is a case where the NACK/DTX is calculated with a larger weight value than the NACK and the DTX is calculated with a larger weight value than the NACK/DTX in the HARQ-ACK feedback set when calculating Y %.

When the calculated Y % is at least Z %, the CWS is increased, and if not, the CWS may be reset to a minimum value. Herein, Z % is a reference value which may be set in the base station (for example, 0<Z<100). For example, Z may be 50 or 80.

Method C-2: When there is at least one DTX feedback for the reference window, the CWS may be increased. The method is a method of overriding to the option-3 or the method A-3. If not (that is, No DTX), the CWS may be adjusted according to the option-3 or the method A-3. Since the DTX represents that the user equipment does not receive the control channel PDCCH/EPDCCH on the unlicensed band due to the interference or hidden node in the same channel, the base station may increase the CWS as the method for solving the problem.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Method D-1: A case where the maximum CWS CW_max is used for K continuous ECCAs. Herein, K is fixed to one of 1, 2, and 3, or may be selected within {1, . . . , 8} by the base station.

Method D-2: A case where there is no DL transmission by the base station for at least T period. T is a predetermined value or a settable value.

Method D-3: A case where the maximum HARQ retransmission is used in K continuous ECCAs. Herein, K is fixed to one of 1, 2, and 3, or may be selected within {1, . . ., 8} by the base station.

The reference window may be (1) a single subframe, (2) multi (for example, two) subframes, or (3) all subframes where the HARQ-ACK feedback is usable in the last DL transmission burst (that is, the latest DL transmission burst on the unlicensed band). The detailed contents may refer to the contents described in Case 1.

Cases 2-1 and 2-2 may be differently applied as described below according to whether the scheduling cell is a LTE-L cell or a LTE-U cell in the cross-carrier scheduling.

In the case where the DL transmission transmitted in the unlicensed carrier is cross-carrier scheduled from a different unlicensed band (that is, an unlicensed carrier, an unlicensed band cell, and an LTE-U cell), the CWS may be adjusted by using the same method as the self-carrier scheduling. The reason is that since the control channels (e.g., the PDCCH/EPDDCH) are transmitted in the unlicensed carrier, the determination of the base station based on the HARQ-ACK response(s) (ACK, NACK, DTX and NACK/DTX) may be equally performed with the case of the self-carrier scheduling.

In the case where the DL transmission transmitted in the unlicensed carrier is cross-carrier scheduled from a licensed band (that is, a licensed carrier, a licensed band cell, and an LTE-L cell), the PDCCH/EPDCCH which are the control channels scheduling the DL transmission is transmitted in the licensed band. In this case, since the DTX feedback is used to determine a decoding situation of the user equipment for the control channel transmitted on the licensed band, it doesn't help adaptively adjusting the CWS for channel access in the unlicensed band. Accordingly, in the cross-carrier scheduling from the licensed band, the method of adjusting the CWS considering the DTX is set not to be used, and the CWS may be adjusted by considering only the ACK and the NACK as the HARQ-ACK response(s) for the DL transmission (for example, PDSCH) on the unlicensed band. Or the CWS may be adjusted by considering only the ACK, the NACK and the NACK/DTX as the HARQ-ACK response(s) for the DL transmission (for example, PDSCH) on the unlicensed band. For example, the DTX as the HARQ-ACK response due to the cross-carrier scheduling from the licensed band may be excluded in the process of applying the cases 1, 2-1, and 2-2. In detail, in the option 3 and the method A-3, the DTX as the HARQ-ACK response due to the cross-carrier scheduling from the licensed band may be excluded when calculating Z %. That is, in the HARQ-ACK feedback set, only the ACK and the NACK are selected to calculate Z % or only the ACK, the NACK and the NACK/DTX are selected to calculate Z %.

Channel Access Procedure for Continuous Transmission Burst

According to a further embodiment of the present invention, a plurality of transmission bursts can be consecutively transmitted in the LTE-U cell. As described above, a transmission burst represents a set of subframes including one or more consecutive subframes. In an embodiment of the present invention, a plurality of transmission bursts being consecutively transmitted refers to a plurality of downlink transmission bursts or a plurality of uplink transmission bursts. That is, in an embodiment of the present invention, a first transmission burst (i.e., a first set of subframes) and a second transmission burst (i.e., a second set of subframes) may represent a first downlink transmission burst (i.e., a first set of downlink subframes) and a second downlink transmission burst (i.e., a second set of downlink subframes) transmitted by the base station, respectively. Alternatively, the first transmission burst (i.e., the first set of subframes) and the second transmission burst (i.e., the second set of subframes) may represent a first uplink transmission burst (i.e., a first set of uplink subframes) and a second uplink transmission burst (i.e., a second set of uplink subframes) transmitted by the user equipment, respectively. In addition, the wireless communication apparatus can be used as a term encompassing a base station performing downlink transmission and a user equipment performing uplink transmission.

In the LBT-based transmission process, LBT parameters for each downlink/uplink transmission burst should be set. As described above, the LBT procedure can be performed by a CCA for a defer period and a backoff procedure. The defer period may consist of 16 μs intervals and n consecutive CCA slots. In this case, n is a positive integer and one CCA slot period may be 9 μs. In addition, the backoff counter used in the backoff procedure can be obtained as a random value within a predetermined CWS. The CWS for obtaining the backoff counter is determined between predetermined minimum CWS value (CW_min) and maximum CWS value (CW_max) of the corresponding channel access priority class. In an embodiment of the present invention, the LBT parameters includes at least one of an integer n for setting the defer period, a CWS, a CW_min, a CW_max, and an allowed CWS set for the backoff procedure. Herein, the allowed CWS set includes a plurality of CWS values between CW_min and CW_max. The LBT parameter may be determined according to any one of Tables 6 to 8 according to a channel access priority class (hereinafter, referred to as a priority class) of data to be transmitted.

TABLE 6

| Priority Class | n | CW_min | CW_max |
|---|---|---|---|
| Highest (Voice) | 1 (or 2) | 3 | 7/7 |
| Next highest (Video) | 1 (or 2) | 7 | 15/15 |
| Typical (Best effort) | 2 (or 3) | 15 | 63/1023 |
| Lowest (Background) | 6 (or 7) | 15 | 1023/1023 |

TABLE 7

| Priority Class | n | CW_min | CW_max | Allowed CWS |
|---|---|---|---|---|
| 1 | 1 | 3 | 7 | {3, 7} |
| 2 | 1 | 7 | 15 | {7, 15} |
| 3 | 3 | 15 | 63 | {15, 31, 63} |
| 4 | 7 | 15 | 1023 | {15, 31, 63, 127, 255, 511, 1023} |

TABLE 8

| Priority Class | n | CW_min | CW_max | Allowed CWS |
|---|---|---|---|---|
| 1 | 2 | 3 | 7 | {3, 7} |
| 2 | 2 | 7 | 15 | {7, 15} |
| 3 | 3 | 15 | 1023 | {15, 31, 63, 127, 255, 511, 1023} |
| 4 | 7 | 15 | 1023 | {15, 31, 63, 127, 255, 511, 1023} |

In the above tables, the higher the priority class value is, the lower the priority class is. According to an embodiment of the present invention, LBT parameters may be determined according to the priority class. For example, the CWS for data transmission is set to any one of a plurality of CWS values included in the allowed CWS set of the priority class of the transmission. The LBT parameters of any one of Tables 6 to 8 may be used for channel access according to the transmission conditions. However, the present invention is not limited thereto, and some parameter values may be used in different values from the table.

As shown in the Tables 6 to 8, each LBT parameter of a higher priority class (i.e., a priority class value is smaller) may be set to be less than or equal to each LBT parameter of a lower priority class (i.e., a priority class value is larger). For example, the minimum CWS value (i.e., CW_min) and the maximum CWS value (i.e., CW_max) corresponding to the higher priority class are set to be less than or equal to the minimum CWS value (i.e., CW_min) and the maximum CWS value (i.e., CW_max) corresponding to the lower priority class, respectively.

According to an embodiment of the present invention, a wireless communication apparatus may perform a channel access procedure for transmission of each of a plurality of sets of subframes. That is, a first channel access procedure for transmitting a first set of subframes and a second channel access procedure for transmitting a second set of subframes may be performed, respectively. In this case, the second set of subframes consists of subframe(s) subsequent to the first set of subframes. However, the first priority class used in the first channel access procedure may be different from the second priority class used in the second channel access procedure. As described above, since the LBT parameters are set differently according to the priority classes, the LBT parameters (e.g., CWS) to be used for each channel access procedure should be determined.

The following methods may be considered for performing the channel access procedure for transmitting each set of subframes in the course of transmission of a plurality of sets of subframes. Method 1 to method 5 can be combined with each other.

Method 1: The channel access procedure can be performed using the LBT parameters based on the priority class value of the transmission. For example, the wireless communication apparatus may perform the channel access procedure for transmitting the corresponding data using a CWS based on the priority class value of the data in the buffer. More specifically, when the condition that the CWS is to be increased is satisfied, the wireless communication apparatus increases the CWS to the next higher allowed value in the order within the allowed set of CWS of the priority class of data to be transmitted. If the CWS is CW_max, the next higher allowed value of the corresponding CWS is set to CW_max. According to an embodiment, the condition under which the CWS is increased may be determined based on the HARQ-ACK responses, as described above. The wireless communication apparatus performs the channel access procedure using the increased CWS. LBT parameters corresponding to priority class values are as shown in Tables 6 to 8 above.

Method 2: The channel access procedure may be performed based on the result of comparison of the priority class values of two consecutive channel access procedures. More specifically, the first channel access procedure for transmitting the first set of subframes and the second channel access procedure for transmitting the second set of subframes subsequent to the first set of subframes may be performed, respectively. In this case, the second channel access procedure may be performed based on a result of comparison between the first priority class value used for the ongoing first channel access procedure and the second priority class value indicated in the second channel access procedure. The second priority class may be indicated by downlink control information (DCI) or uplink control information (UCI) according to uplink/downlink transmission.

According to an embodiment of the present invention, a channel access procedure may be performed using the LBT parameters obtained by combining the aforementioned CWS adjustment procedure and the priority class value of the corresponding transmission. When the CWS is adjusted based on the HARQ-ACK response, the CWS may be increased or reset based on the HARQ-ACK response corresponding to the first set of subframes. However, when the first priority class value of the first channel access procedure is 3 and the second priority class value of the second channel access procedure is 2 (i.e., when the priority class is changed from the lower priority class to the higher priority class), the first LBT parameter set corresponding to the first priority class may be {CW_min, CW_max, n}={15, 63, 3} and the second LBT parameter set corresponding to the second priority class may be {CW_min, CW_max, n}={7, 15, 1} (see Table 7). If the LBT parameters of the second channel access procedure is determined based on the first LBT parameter set, the second channel access procedure may be performed using the adjusted CWS according to the aforementioned method. However, when the LBT parameters of the second channel access procedure is to be determined based on the second LBT parameter set, the CWS to be used in the second channel access procedure should be less than or equal to the CWS used in the first channel access procedure since each parameter of the second LBT parameter set is smaller than each parameter of the first LBT parameter set. Accordingly, the wireless communication apparatus may obtain the LBT parameters and perform the second channel access procedure by considering the CWS adjustment procedure and the second priority class value together.

As described above, a channel access procedure based on the comparison result of the first priority class and the second priority class is required in the transmission process of the plurality of sets of subframes. According to an exemplary embodiment of the present invention, the wireless communication apparatus may perform the following channel access procedure according to the comparison result between the first priority class value P1 of the first channel access procedure and the second priority class value P2 of the second channel access procedure.

(1) If P1 is larger than or equal to P2: The wireless communication apparatus may perform the second channel access procedure using the ongoing first channel access procedure. For example, the LBT parameters of the second channel access procedure may be determined based on the LBT parameters used in the first channel access procedure. However, if the condition that the CWS is to be increased based on the HARQ-ACK responses is satisfied, the CWS of the second channel access procedure may be i) set to the CW_max value of the second priority class P2, or ii) increased, within the allowed set of CWS of the second priority class P2, to the next higher allowed value that the previous CWS. In this case, when the previous CWS is CW_max, the next higher allowed value is set to CW_max. In addition, when the CWS is reset based on the HARQ-ACK, the CWS of the second channel access procedure may be set to the CW_min value of the second priority class P2. According to another embodiment of the present invention, the second channel access procedure may be performed using an ongoing backoff counter of the first channel access procedure. More specifically, if the backoff counter of the first channel access procedure has not expired, the wireless communication apparatus may perform the second channel access procedure using the remaining backoff counter of the first channel access procedure. That is, the wireless communication apparatus may succeed the ongoing first channel access procedure in the second channel access procedure without terminating the first channel access procedure.

(2) If P1 is smaller than P2: The wireless communication apparatus may terminate the ongoing first channel access procedure and perform the second channel access procedure based on the second priority class P2. For example, the LBT parameters of the second channel access procedure may be determined based on the second priority class P2. According to an embodiment, the CWS of the second channel access procedure is set to any one of a plurality of CWS values included in the allowed CWS set of the second priority class P2. If the condition that the CWS is to be increased based on the HARQ-ACK responses is satisfied, the CWS of the second channel access procedure may be increased to be at least the CW_min value of the second priority class P2. That is, the CWS of the second channel access procedure may be increased, within the allowed CWS set of the second priority class P2, to the next higher allowed value than the previous CWS. In addition, when the CWS is reset based on the HARQ-ACK, the CWS of the second channel access procedure may be set to the CW_min value of the second priority class P2. Therefore, the CWS of the second channel access procedure is set to have a value of at least CW_min of the second priority class P2 or more.

Method 3: The channel access procedure may be performed using the LBT parameters used in the most recent transmission of set of subframes. For example, the LBT parameters (e.g., CWS) of the second channel access procedure may be determined based on the LBT parameters (e.g., CWS) used in the first channel access procedure.

Method 4: The channel access procedure may be performed using the LBT parameters of the priority class corresponding to the best effort type of the wireless communication terminal.

Method 5: The channel access procedure may be performed using basic LBT parameters specifically set for the wireless communication terminal.

Hereinafter, a further embodiment of a method for adaptively adjusting the CWS when performing channel access in the unlicensed band will be described. As described above, the CWS may be adjusted based on the HARQ-ACK response. According to an embodiment of the present invention, the CWS may be adjusted considering the channel access priority class (i.e., the priority class) of the corresponding transmission.

Case 3: CWS Coordination Considering Channel Access Priority Class

To illustrate the embodiments of case 3, variables are defined as follows. Among the embodiments of the case 3, description of the same or corresponding parts as those of the case 1, case 2-1 or case 2-2 described above will be omitted.

p: priority class value

CW_min_p: a predetermined minimum CWS value of priority class p

CW_max_p: a predetermined maximum CWS value of priority class p

CW_p: CWS for transmission of priority class p. CW_p is set to any one of a plurality of CWS values between CW_min_p and CW_max_p included in the allowed CWS set of priority class p.

According to an embodiment of the present invention, the CWS adjustment procedure may be performed by the following steps A-1 and A-2.

Step A-1) For every priority class p, CW_p is set to CW_min_p. In this case, the priority class p includes {1, 2, 3, 4}.

Step A-2) If at least Z % (e.g., Z=80) of the HARQ-ACK values for downlink transmission(s) in a reference subframe k are determined as NACK, CW_p is increased to the next higher allowed value. Otherwise, go to step A-1.

Herein, the reference subframe k includes the start subframe of the most recent transmission by the base station. In addition, the reference subframe k is a subframe for which at least some HARQ-ACK feedback is expected to be available. If CW_p=CW_max_p, the next higher allowed value for CW_p adjustment is CW_max_p.

Meanwhile, according to the CWS adjustment procedure of steps A-1 and A-2, the base station should always start from step A-1 which sets CW_p to CW_min_p in order to perform transmission associated with the priority class p. In this case, CW_p can be set only between CW_min_p and the next higher allowed value. For example, if the priority class p is 3 and the allowed CWS set is {15, 31, 63}, CW_p can be adjusted only between 15 (i.e., CW_min_p) and 31 (i.e., the next higher allowed value). Further, even if the priority class p is 4 and the allowed CWS set is {15, 31, 63, 1023}, CW_p can be adjusted only between 15 (i.e., CW_min_p) and 31 (i.e., the next higher allowed value).

Therefore, according to another embodiment of the present invention, the CWS adjustment procedure may be performed by the following steps B-1 to B-3.

Step B-1) If CW_p is larger than (alternatively, larger than or equal to) CW_min_p, go to step B-3. Otherwise, go to step B-2.

Step B-2) For every priority classe p, CW_p is set to CW_min_p. In this case, the priority class p includes {1, 2, 3, 4}.

Step B-3) If at least Z % (e.g., Z=80) of the HARQ-ACK values for downlink transmission(s) in a reference subframe k are determined as NACK, CW_p is increased to the next higher allowed value. Otherwise, go to step B-2.

Herein, the reference subframe k includes the start subframe of the most recent transmission by the base station. In addition, the reference subframe k is a subframe for which at least some HARQ-ACK feedback is expected to be available. If CW_p=CW_max_p, the next higher allowed value for CW_p adjustment is CW_max_p.

According to the steps B-1 to B-3 above, if CW_p is increased at least once, the base station starts from step B-3 which conditionally increases CW_p in order to perform transmission associated with priority class p. In addition, if CW_p is equal to CW_min, that is, the first transmission is performed or CW_p is reset in the previous transmission, the base station starts from step B-2 which resets CW_p in order to perform transmission associated with priority class p. The above steps B-1 to B-3 can be also described as steps C-1 and C-2 as follows.

Step C-1) For every priority classe p, CW_p is set to CW_min_p. In this case, the priority class p includes {1, 2, 3, 4}.

Step C-2) If at least Z % (e.g., Z=80) of the HARQ-ACK values for downlink transmission(s) in a reference subframe k are determined as NACK, CW_p is increased to the next higher allowed value and remain in step C-2. Otherwise, go to step C-1.

Herein, the reference subframe k includes the start subframe of the most recent transmission by the base station. In addition, the reference subframe k is a subframe for which at least some HARQ-ACK feedback is expected to be available. If CW_p=CW_max_p, the next higher allowed value for CW_p adjustment is CW_max_p.

As described above, according to another embodiment of the present invention, when the CWS is increased in the CWS adjustment step, the CWS may be maintained at the increased value. Therefore, the CWS for the next downlink transmission of the base station may be set based on the maintained CWS.

Figure 15:
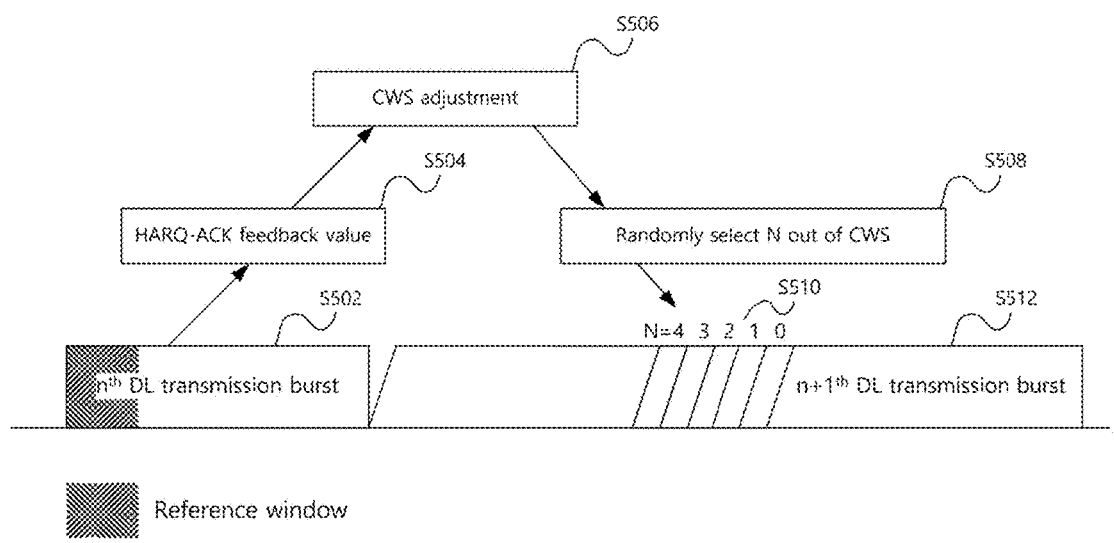
FIGS. 15 to 17 illustrate a DL transmission processing an unlicensed band according to the present invention.
Figure 16:
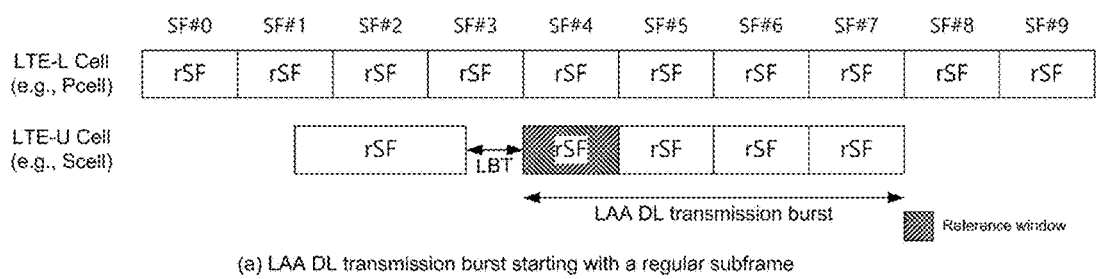
Figure 16:
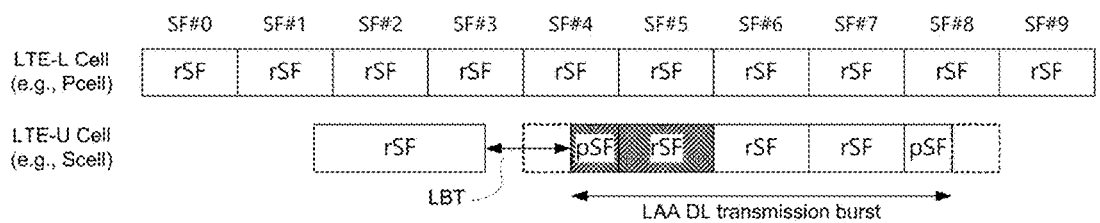
Figure 17:
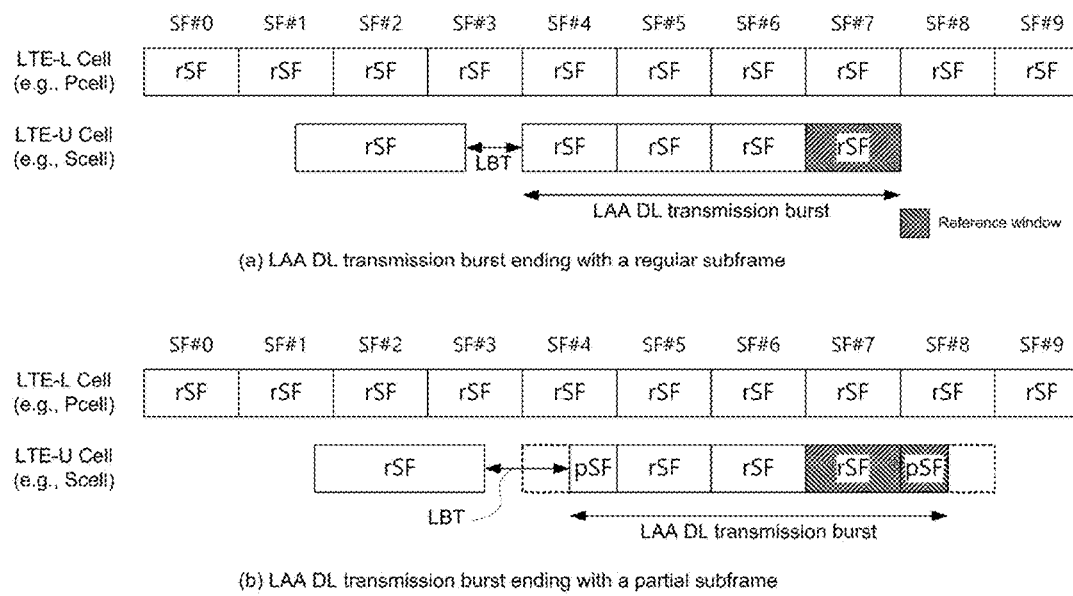

FIGS. 15 to 17 illustrate a signal transmitting process according to an example of the present invention. FIG. 15 illustrates a method for adjusting a CWS according to case 1 and FIGS. 16 and 17 illustrate a reference window for generating an HARQ-ACK feedback set. Cases 2-1, case 2-2 and case 3 may be similarly performed.

Referring to FIG. 15, the base station may transmit an n-th DL transmission burst in the unlicensed band (e.g., LTE-U cell) (S502) and thereafter, transmit an (n+1)-th DL transmission burst based on the ECCA when additional DL transmission is required (S512). In detail, the base station additionally performs the random back-off in the CW when the channel in the unlicensed band is idle during the ECCA defer period (S510). The base station may generate a random number N in the CW (e.g., [0, q−1]) (S508) and perform the back-off as long as slots corresponding to the random number N (S510). In the present invention, the CWS is adjusted based on the HARQ-ACK feedback values from user equipments (S506). The HARQ-ACK feedback values used for adjusting the CWS include HARQ-ACK feedback values for a most recent DL transmission burst (n-th DL transmission burst). The HARQ-ACK feedback values used for adjusting the CWS include HARQ-ACK feedback values for the DL transmission on the reference window in the DL transmission burst (S504).

When case 1 is applied, the CWS may be adjusted as follows based on the HARQ-ACK feedback values. Cases 2-1, case 2-2 and case 3 may be similarly applied.

Option 1: When all of the HARQ-ACK feedback values for the reference window are NACK, the CWS is increased and if not, the CWS is reset to the minimum value.

Option 2: When at least one of the HARQ-ACK feedback values for the reference window is the NACK, the CWS is increased and if not, the CWS is reset to the minimum value.

Option 3: When the NACK among the HARQ-ACK feedback values for the reference window is at least Z % (0<Z<100), the CWS is increased and when the NACK is not at least Z %, the CWS is reset to the minimum value. (When the CWS is increased, the CWS may be maintained at the increased value.)

When the CWS is increased, the CWS may be doubled, exponentially increased between the minimum value (CW_min) and a maximum value (CW_max), or increased to the maximum value.

Referring to FIGS. 16 and 17, the reference window may be constituted by start subframe(s) (FIG. 16) or last subframe(s) (FIG. 17) of the most recent DL transmission burst (n-th DL transmission burst). When the reference window is positioned at the start of the DL transmission burst, the reference window may be constituted by (i) one regular subframe (refer to FIG. 16(a)) and (ii) one partial subframe and one regular subframe (refer to FIG. 16(b)). Further, when the reference window is positioned at the end of the DL transmission burst, the reference window may be constituted by (i) one regular subframe (refer to FIG. 17(a)) and (ii) one regular subframe and one sub subframe (refer to FIG. 17(b)).

In the present invention, it is assumed that the HARQ-ACK response transmitted from the user equipment is transmitted through the PUCCH or PUSCH on the PCell in the licensed band. When uplink transmission on the unlicensed band is permitted, the present invention may be applied even to the case in which the HARQ-ACK response is transmitted through the PUCCH or PUSCH on the unlicensed band.

Figure 18:
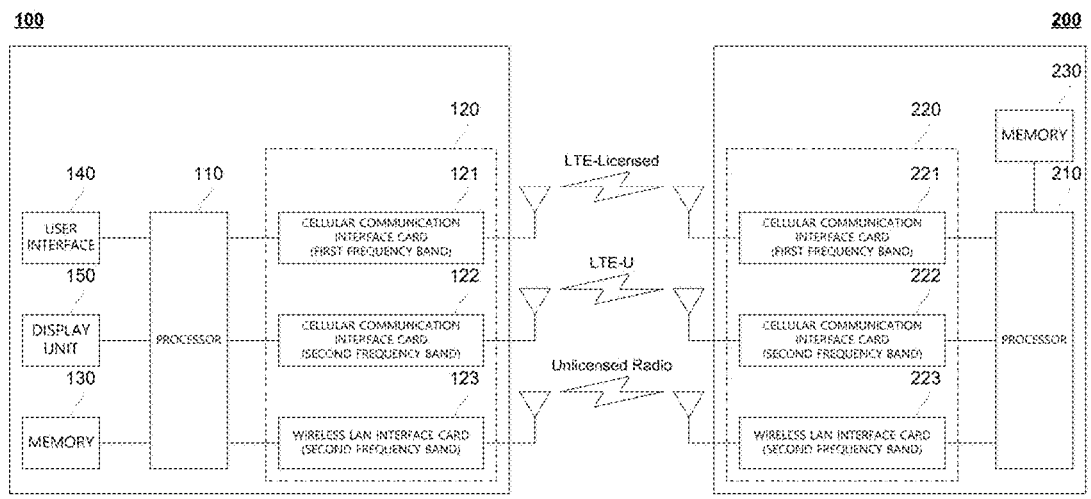
FIG. 18 illustrates configurations of a user equipment and a base station according to an exemplary embodiment of the present invention.

FIG. 18 illustrates configurations of a user equipment and a base station according to an exemplary embodiment of the present invention. In the present invention, the user equipment may be implemented by various types of wireless communication devices or computing devices of which portability and mobility are guaranteed. The user equipment (UE) may be referred to as terminal, a station (STA), a mobile subscriber (MS), and the like. In the present invention, the base station may control and take charge of cells (e.g., a macro cell, a femto cell, a pico cell, and the like) corresponding to service areas and perform functions including signal transmission, channel designation, channel monitoring, self diagnosis, relay, and the like. The base station may be referred to as an evolved NodeB (eNB), an access point (AP), and the like.

Referring to FIG. 18, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process a DL signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 18, the communication module 120 is illustrated as the integrated module, but the respective network interface cards may be independently disposed according to a circuit configuration or a purpose unlike FIG. 18.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may transmit/process a DL signal according to the proposal of the present invention.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 18, the communication module 220 is illustrated as the integrated module, but the respective network interface cards may be independently disposed according to the circuit configuration or the purpose unlike FIG. 18.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 18, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is usable in various communication devices (e.g., a station or access point using unlicensed band communication, a station or a base station using cellular communication, or the like) used in a wireless communication system.

The invention claimed is:

1. A method for performing downlink transmission in a specific cell by a base station in a cellular wireless communication system, the method comprising:
receiving a plurality of hybrid automatic repeat request acknowledgment (HARQ-ACK) responses for downlink transmission(s) in a reference subframe of the specific cell;
setting contention window sizes of a plurality of priority classes for a transmission in the specific cell;
selecting a random number N within a contention window size of a particular priority class among the plurality of priority classes; and
performing, after sensing a channel on which a downlink transmission of the particular priority class is to be performed being idle for at least N slot periods, the downlink transmission of the particular priority class on the channel,
wherein the setting contention window sizes comprises:
increasing contention window size of every priority class of the plurality of priority classes to a next higher allowed value in response to a ratio of negative acknowledgement (NACK) among the plurality of HARQ-ACK responses being equal to or more than a reference value, wherein the increased contention window size of every priority class is maintained, and
setting the contention window size of every priority class of the plurality of priority classes to a minimum value in response to the ratio of the NACK among the plurality of HARQ-ACK responses being less than the reference value.

2. The method of claim 1, wherein a contention window size for a next downlink transmission of the base station is set based on the maintained contention window size.

3. The method of claim 1, wherein the reference subframe includes a starting subframe of a most recent transmission by the base station.

4. The method of claim 3, wherein when the starting subframe is a partial subframe, the reference subframe further includes a next subframe of the starting subframe.

5. The method of claim 1, wherein the contention window size is set to any one of a plurality of contention window size values included in a set of allowed contention window sizes of a channel access priority class of the corresponding downlink transmission.

6. The method of claim 1, wherein when the contention window size is a maximum contention window size, the next higher allowed value is the maximum contention window size.

7. The method of claim 1, wherein when the plurality of HARQ-ACK responses includes discontinuous transmission (DTX), the ratio of the NACK further includes a ratio of the DTX.

8. The method of claim 1, wherein the specific cell is an unlicensed cell and the plurality of HARQ-ACK responses are received from a plurality of user equipments through a licensed cell.

9. A base station used in a cellular wireless communication system, the base station comprising:
a wireless communication module; and
a processor,
wherein the processor is configured to:
receive a plurality of hybrid automatic repeat request acknowledgment (HARQ-ACK) responses for downlink transmission(s) in a reference subframe of the specific cell,
set contention window sizes of a plurality of priority classes for a transmission in the specific cell,
select a random number N within a contention window size of a particular priority class among the plurality of priority classes, and
perform, when a channel on which a downlink transmission of the particular priority class is to be performed is idle for at least N slot periods, the downlink transmission of the particular priority class on the channel,
wherein contention window size of every priority class of the plurality of priority classes is increased to a next higher allowed value when a ratio of negative acknowledgement (NACK) among the plurality of HARQ-ACK responses is equal to or more than a reference value, and wherein the increased contention window size of every priority class is maintained, and
wherein the contention window size of every priority class of the plurality of priority classes is set to a minimum value when the ratio of the NACK among the plurality of HARQ-ACK responses is less than the reference value.

10. The apparatus of claim 9, wherein a contention window size for a next downlink transmission of the base station is set based on the maintained contention window size.

11. The apparatus of claim 9, wherein the reference subframe includes a starting subframe of a most recent transmission by the base station.

12. The apparatus of claim 11, wherein when the starting subframe is a partial subframe, the reference subframe further includes a next subframe of the starting subframe.

13. The apparatus of claim 9, wherein the contention window size is set to any one of a plurality of contention window size values included in a set of allowed contention window sizes of a channel access priority class of the corresponding downlink transmission.

14. The apparatus of claim 9, wherein when the contention window size is a maximum contention window size, the next higher allowed value is the maximum contention window size.

15. The apparatus of claim 9, wherein when the plurality of HARQ-ACK responses includes discontinuous transmission (DTX), the ratio of the NACK further includes a ratio of the DTX.

16. The apparatus of claim 9, wherein the specific cell is an unlicensed cell and the plurality of HARQ-ACK responses are received from a plurality of user equipments through a licensed cell.

* * * * *